(12) United States Patent
Ichikawa

(10) Patent No.: US 9,272,636 B2
(45) Date of Patent: Mar. 1, 2016

(54) WORK VEHICLE FOR TRANSMITTING DRIVE POWER FROM AN ELECTRIC MOTOR TO A PROPELLING TRANSMISSION SYSTEM

(71) Applicant: Kubota Corporation, Osaka-shi (JP)

(72) Inventor: Nobushige Ichikawa, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/713,072

(22) Filed: May 15, 2015

(65) Prior Publication Data

US 2015/0246622 A1    Sep. 3, 2015

Related U.S. Application Data

(62) Division of application No. 13/233,475, filed on Sep. 15, 2011, now Pat. No. 9,045,028.

(30) Foreign Application Priority Data

Mar. 30, 2011 (JP) ................. 2011-076592
Mar. 30, 2011 (JP) ................. 2011-076593
Mar. 30, 2011 (JP) ................. 2011-076594
Mar. 30, 2011 (JP) ................. 2011-076595

(51) Int. Cl.
*B60K 1/04* (2006.01)
*B60L 15/00* (2006.01)
(Continued)

(52) U.S. Cl.
CPC .......... *B60L 15/007* (2013.01); *B60H 1/00207* (2013.01); *B60H 1/00378* (2013.01); *B60H 1/00564* (2013.01); *B60K 1/00* (2013.01); *B60K 1/04* (2013.01); *B60K 17/10* (2013.01); *B60L 1/003* (2013.01); *B60L 1/08* (2013.01); *B60L 11/02* (2013.01); *B60L 11/16* (2013.01); *B60L 11/1874* (2013.01); *B60L 11/1877* (2013.01); *B60L 15/2054* (2013.01); *B60R 16/02* (2013.01); *B60H 2001/00235* (2013.01); *B60K 2001/005* (2013.01); *B60L 2200/40* (2013.01); *B60L 2240/34* (2013.01); *B60L 2240/36* (2013.01); *B60L 2240/441* (2013.01); *B60L 2240/545* (2013.01); *B60L 2240/662* (2013.01); *B60Y 2200/22* (2013.01); *B60Y 2200/221* (2013.01); *B60Y 2200/92* (2013.01);
(Continued)

(58) Field of Classification Search
CPC ............ B60L 11/1874; B62K 2202/00; B62K 2204/00; Y02T 10/7005; B60R 22/18; B60R 22/26
See application file for complete search history.

(56) References Cited

U.S. PATENT DOCUMENTS 3,522,839 A    8/1970    Wendt et al.
3,868,896 A    3/1975    Doll et al.
(Continued)

FOREIGN PATENT DOCUMENTS

JP    63195016 A    8/1988
JP    370647 A      3/1991
(Continued)

*Primary Examiner* — Brodie Follman
(74) *Attorney, Agent, or Firm* — The Webb Law Firm

(57) ABSTRACT

A work vehicle comprising, a power unit, an electric motor activated by electric power from the power unit, a propelling transmission system for receiving drive power from the electric motor, a cabin including a roof portion the driver rides, an air conditioner for adjusting air temperature in the interior of the cabin. the power unit and the air conditioner are provided in the roof portion of the cabin.

5 Claims, 10 Drawing Sheets

(51) Int. Cl.

| | | |
|---|---|---|
| *B60H 1/00* | (2006.01) | |
| *B60K 1/00* | (2006.01) | |
| *B60K 17/10* | (2006.01) | |
| *B60L 1/00* | (2006.01) | |
| *B60L 1/08* | (2006.01) | |
| *B60L 11/16* | (2006.01) | |
| *B60L 11/18* | (2006.01) | |
| *B60L 15/20* | (2006.01) | |
| *B60L 11/02* | (2006.01) | |
| *B60R 16/02* | (2006.01) | |

(52) U.S. Cl.
CPC ......... *B60Y 2400/61* (2013.01); *Y02T 10/7005* (2013.01); *Y02T 10/705* (2013.01); *Y02T 10/7027* (2013.01); *Y02T 10/7275* (2013.01); *Y02T 10/7291* (2013.01); *Y02T 90/16* (2013.01); *Y10S 903/951* (2013.01)

(56) References Cited

U.S. PATENT DOCUMENTS

| | | | |
|---|---|---|---|
| 4,181,188 A | 1/1980 | Dessert | |
| 4,721,031 A | 1/1988 | Nakata et al. | |
| 4,781,119 A | 11/1988 | Davis | |
| 5,513,721 A * | 5/1996 | Ogawa | B62K 19/46 180/220 |
| 5,647,450 A * | 7/1997 | Ogawa | B60L 11/1874 180/220 |
| 5,881,558 A | 3/1999 | Kawahara et al. | |
| 5,929,826 A * | 7/1999 | Shinkawa | H01Q 1/103 343/840 |
| 6,279,978 B1 | 8/2001 | Schreyer et al. | |
| 6,296,303 B1 * | 10/2001 | Kamiya | B60H 1/00535 296/193.02 |
| 6,397,965 B1 | 6/2002 | McFarlane et al. | |
| 6,423,894 B1 | 7/2002 | Patz et al. | |
| 6,445,080 B1 | 9/2002 | Daqoa et al. | |
| 7,252,585 B2 | 8/2007 | Ichikawa et al. | |
| 7,434,611 B2 | 10/2008 | Wunderlich et al. | |
| 7,571,785 B2 | 8/2009 | Ferdows | |
| 7,866,422 B2 | 1/2011 | Peters | |
| 7,915,753 B2 | 3/2011 | Endo et al. | |
| 8,033,899 B2 | 10/2011 | Ichikawa et al. | |
| 8,267,825 B2 | 9/2012 | Kakinuma et al. | |
| 8,302,997 B2 | 11/2012 | Veenstra | |
| 8,366,524 B2 | 2/2013 | Ichikawa et al. | |
| 8,376,817 B2 | 2/2013 | Ichikawa | |
| 8,443,926 B2 * | 5/2013 | Kanno | B60L 3/0023 180/220 |
| 8,616,310 B2 * | 12/2013 | Lopez | B62D 49/00 180/53.1 |
| 8,776,936 B2 * | 7/2014 | Mimura | B60K 7/0007 180/220 |
| 8,936,129 B2 * | 1/2015 | Honda | B62K 11/10 180/220 |
| 9,045,028 B2 * | 6/2015 | Ichikawa | B60H 1/00207 |
| 2004/0168449 A1 | 9/2004 | Homan et al. | |
| 2005/0005532 A1 | 1/2005 | Ichikawa et al. | |
| 2005/0092005 A1 | 5/2005 | Wunderlich et al. | |
| 2005/0279541 A1 | 12/2005 | Peters | |
| 2007/0044492 A1 | 3/2007 | Ichikawa et al. | |
| 2008/0062622 A1 | 3/2008 | Fukazu et al. | |
| 2008/0115998 A1 | 5/2008 | Naganuma et al. | |
| 2008/0277173 A1 | 11/2008 | Midrouillet et al. | |
| 2009/0205897 A1 | 8/2009 | Endo et al. | |
| 2010/0094498 A1 | 4/2010 | Watanabe et al. | |
| 2010/0107921 A1 | 5/2010 | Kakinuma et al. | |
| 2010/0242513 A1 | 9/2010 | Nishino et al. | |
| 2010/0269530 A1 | 10/2010 | Ichikawa | |
| 2011/0028078 A1 | 2/2011 | Cermak et al. | |
| 2011/0030406 A1 | 2/2011 | Ichikawa et al. | |
| 2011/0046831 A1 * | 2/2011 | Ananthakrishna | B60K 6/12 701/22 |
| 2011/0246024 A1 * | 10/2011 | Hattori | B62J 99/00 701/36 |
| 2012/0247846 A1 * | 10/2012 | Ichikawa | B60H 1/00207 180/65.21 |
| 2013/0118708 A1 | 5/2013 | Ichikawa | |

FOREIGN PATENT DOCUMENTS

| | | |
|---|---|---|
| JP | 4133260 A | 5/1992 |
| JP | 565775 U | 8/1993 |
| JP | 999866 A | 4/1997 |
| JP | 1178555 A | 3/1999 |
| JP | 11273982 A | 10/1999 |
| JP | 2000272364 A | 10/2000 |
| JP | 20039607 A | 1/2003 |
| JP | 200466889 A | 3/2004 |
| JP | 2004168149 A | 6/2004 |
| JP | 2008155771 A | 7/2006 |
| JP | 200715472 A | 1/2007 |
| JP | 2007161111 A | 6/2007 |
| JP | 2007312488 A | 11/2007 |
| JP | 200862780 A | 3/2008 |
| JP | 2008168871 A | 7/2008 |
| JP | 200989673 A | 4/2009 |
| JP | 2009154826 A | 7/2009 |
| JP | 2010149731 A | 7/2010 |
| JP | 2010188868 A | 9/2010 |
| JP | 2012106522 A | 6/2012 |

* cited by examiner

WORK VEHICLE FOR TRANSMITTING DRIVE POWER FROM AN ELECTRIC MOTOR TO A PROPELLING TRANSMISSION SYSTEM

This application is a divisional application of U.S. patent application Ser. No. 13/233,475, filed Sep. 15, 2011, entitled "Work Vehicle", which claims the benefit of Japanese Patent Application Nos. 2011-076595, 2011-076594, 2011-076593, and 2011-076592, all filed on Mar. 30, 2011, the disclosures of all of which are hereby incorporated by reference in their entirety.

TECHNICAL FIELD

The present invention relates to a work vehicle for transmitting drive power from an electric motor activated by electric power from a power unit to a propelling transmission system, and more particularly to improvement of an arrangement of the power unit.

RELATED ART

An example of the work vehicle having the above-noted construction is disclosed in Japanese Unexamined Patent Application Publication No. 2004-66889 in which a power unit (a battery unit in the publication) is provided in a top surface of a vehicle body of an electric-powered bus such as an electric car or a hybrid electric car. With such an arrangement, vehicle-running air is directed to the battery unit, thereby to cool the battery unit.

As described in Japanese Unexamined Patent Application Publication No. 2004-66889 in which the power unit is mounted in the roof portion, there is no need to secure a space for arranging the power unit within the vehicle body, as a result of which ambient air is taken in when the vehicle is running to satisfactorily cool the power unit.

In the case where the work vehicle is a tractor, air conditioning is required in the interior of a cabin, which needs the construction in which a capacitor is driven by an engine of the vehicle body to guide a coolant from the capacitor to the cabin. As a result, pipe arrangement operation would take time and effort.

In the above-noted construction in which drive power of the electric motor is transmitted to the propelling transmission system in the work vehicle having the cabin in the vehicle body, it is necessary to rationally arrange the power unit and the air conditioner.

In particular, when a lithium-ion battery which might be deteriorated in its performance by increase in temperature is used, waterproof property would also be required while cooling in order to prevent electric leakage.

Further, Japanese Unexamined Patent Application Publication No. 2007-161111 discloses a hybrid four-wheel drive vehicle including electric motors acting as a driving device in right and left wheels, and an inverter (corresponding to a power control unit of the present invention) arranged on a side surface of a fender apron provided forwardly of the vehicle for supplying electric power to the right and left electric motors. This Japanese reference discloses that the inverter is provided with a heat sink with a plurality of fins and is cooled by vehicle-running air introduced from a front grille.

Further, Japanese Unexamined Patent Application Publication No. 2008-62780 discloses a hybrid vehicle including a power unit housing section provided in a rear portion of a rear seat in the car for housing a power unit (corresponding to the power control unit of the present invention) for activating a motor, a duct-shaped cooling air intake passage for supplying cooling air to the power unit housing section, and a cooling air discharge passage for discharging cooling air from the power unit housing section. This document discloses that a cooling fan is provided for directing air in the power unit housing section to the cooling air discharge passage. The cooling fan is driven to supply air drawn at the cooling air intake passage to the power unit for cooling and discharge air after cooling to the cooling air discharge passage.

Many of the work vehicle such as a hybrid-type vehicle with the electric motor for acquiring drive power for propelling the vehicle employ a three-phase motor as the electric motor for producing three-phase alternating current from DC power received from the power unit such as a battery by the power control unit for supply to the electric motor. Such a type of the power control unit is provided with a large-capacity electronic control element for adjusting rotational speed of the electric motor by varying frequency of three-phase alternating current, as a result of which heat is generated when electric power is controlled.

From the above-noted reasons, the construction for cooling the power control unit is provided as disclosed in Japanese Unexamined Patent Application Publication No. 2007-161111 and Japanese Unexamined Patent Application Publication No. 2008-62780. It should be noted that, when a brushless DC motor is used as the electric motor, it is also required to control electric power supplied from a field coil based on rotation and thus heat would be generated when the electronic control element is activated, which requires cooling in the same way as the three-phase motor.

However, from the viewpoint of cooling the power control unit satisfactorily, it is not preferable to arrange the power control unit in the interior of the vehicle. Thus, it has been required that the power control unit is provided in a proper position to perform satisfactory cooling.

Further, Japanese Unexamined Patent Application Publication No. 11-78555 discloses a construction including an electric motor (corresponding to a motor generator of the present invention), a flywheel and a transmission, which are connected to a crank shaft of an engine in the mentioned order. This reference discloses that electric power generated at the electric motor is charged to a capacitor when the engine speed is reduced, for example, and electric power charged to the capacitor can be supplied to the electric motor as necessary.

As described in Japanese Unexamined Patent Application Publication No. 11-78555, the electric motor includes a rotor having a permanent magnet, and a stator provided to surround the rotor. The stator consists of a core made of a magnetic member such as a magnetic steel plate and a plurality of coils wound around the core. The stator is provided in a rear end side of the engine, for example, while the rotor is connected to an output shaft (crank shaft) of the engine.

Since the stator is large-sized compared with the rotor, it is rational that, when the electric motor is provided in the engine, the stator is fixed to the engine side first and then the rotor is inserted into the interior space of the stator and fed to a rear end of the output shaft to be connected and fixed to the output shaft.

However, since the permanent magnet provided in the rotor is strong and the magnetic member is used for the core of the stator, a great drawing force is applied between the rotor and stator when the rotor is inserted into the interior space of the stator. As a result, it would be difficult to adjust the position of the rotor, that is, the rotor would be sharply displaced, for example. In addition, the rotor might stick to an inner periphery of the stator. If the rotor sticks to the inner periphery of the stator in this way, disconnecting the rotor from the stator would be difficult and troublesome. There is room for improvement in this regard.

According to Japanese Unexamined Patent Application Publication No. 2003-9607, a first electric motor for propelling the vehicle is provided forwardly of the vehicle body, a second electric motor (hydraulic motor in this reference) is provided in a lateral side position of the first electric motor. This reference shows a hydraulic cylinder for steering a power steering device and a hydraulic cylinder for vertically moving a work implement acting as hydraulic devices for receiving pressure oil from the hydraulic pump.

Japanese Unexamined Patent Application Publication No. 2003-9607 also discloses a construction as a comparable example in which an engine is mounted forwardly of the vehicle body, an electric motor is attached to a lateral side portion of the engine, and a hydraulic pump is provided activated by the electric motor.

According to any of the constructions disclosed in Japanese Unexamined Patent Application Publication No. 2003-9607, a rear transmission case mounted rearwardly of the vehicle body is used as a hydraulic tank, thereby to form a hydraulic circuit for allowing pressure oil of the hydraulic cylinder to return to the transmission case.

As described in Japanese Unexamined Patent Application Publication No. 2003-9607, in the vehicle with the hydraulic pump activated by the electric motor, it is possible to activate the electric motor when the hydraulic device is operated to supply pressure oil from the hydraulic pump to the work device such as a hydraulic cylinder, which provides an advantageous aspect of preventing wasteful driving.

On the other hand, in the vehicle as disclosed in Japanese Unexamined Patent Application Publication No. 2003-9607 in which the electric motor and the hydraulic motor are mounted forwardly of the vehicle body while the transmission case is mounted rearwardly of the vehicle body, pipework for supplying lubrication oil to the hydraulic pump as pressure oil becomes long in the longitudinal direction of the vehicle body, which increases the length of elements forming the hydraulic circuit. There is room for improvement in this regard as well.

SUMMARY OF THE INVENTION

An object of the present invention is to provide a rational construction for a vehicle including a power unit and an air conditioner.

Another object of the present invention is to achieve satisfactory cooling by rationally arranging a power control unit for controlling electric power supplied to an electric motor.

A further object of the present invention is to provide a rational construction for the vehicle in which a rotor of the electric motor is easily connectable to an output shaft of an engine.

A still further object of the present invention is to provide a rational construction for the vehicle in which a hydraulic system is miniaturized by rationally arranging an electric hydraulic pump unit.

A work vehicle according to the present invention comprises:
a power unit;
an electric motor activated by electric power from the power unit;
a propelling transmission system for receiving drive power from the electric motor;
a cabin including a roof portion the driver rides; and
an air conditioner for adjusting air temperature in the interior of the cabin,
wherein the power unit and the air conditioner are provided in the roof portion of the cabin.

With this arrangement, since the power unit is provided in the roof portion of the cabin, there is no need to secure space for arranging the power unit in the vehicle body. Further, since the air conditioner is provided in the cabin, there is no need to arrange pipework for supplying and discharging a coolant between the cabin and the vehicle body, unlike an air conditioner having a capacitor in the vicinity of the electric motor for propelling the vehicle body. In addition, since the power unit and the air conditioner are mounted in the roof portion, there is no need to secure space for arranging the power unit and the air conditioner in the vehicle body and it would be possible to compactly arrange the power unit and the air conditioner in the roof portion that is relatively easily changeable in the design.

As a result, the rational construction of the vehicle is provided in which the power unit is properly arranged, pipework operation is reduced, and the power unit and the air conditioner are mounted in the roof portion in a compact way without changing the design of the vehicle body.

The above-noted arrangement may have a construction in which the roof portion has a roof interior space defined between a lower bottom wall and an upper top wall; a unit housing case for housing the power unit, an air-intake duct for supplying air from the outside of the cabin to the unit housing case, and an air-discharge duct for feeding out air within the unit housing case to the outside of the cabin are provided in the roof interior space; a cooling space is formed from an interior space of the air-intake duct, an interior space of the unit housing case and an interior space of the air-discharge duct; air is drawn from the outside of the cabin through the air-intake duct; and a fan is provided in the cooling space for discharging air from the unit housing case to the outside of the cabin through the air-discharge duct.

With this arrangement, the power unit can be housed in the unit housing case disposed in the roof interior space between the bottom wall and the upper wall of the roof portion. Further, since the cooling space is formed in the unit housing case by connecting the air-intake duct to the air-discharge duct to allow air to be drawn from the outside of the cabin by the air-intake duct while the fan is provided for directing air having passed the unit housing space to the outside of the cabin through the air-discharge duct, it becomes possible to supply air from the outside of the cabin to the power unit for cooling while preventing rainwater or dust from entering the power unit even when the vehicle body stops running.

The above-noted arrangement may have a construction in which a ventilation space for taking in air from the outside of the cabin is formed in the roof portion to be separated from the cooling space; and air taken in from the ventilation space is supplied to the air conditioner when the air conditioner performs ventilation in the interior of the cabin.

With this arrangement, air conditioning by the air conditioner in the cabin becomes possible by taking in air from the outside of the cabin to the ventilation space formed independently of the cooling space in the roof portion. Further, since air in the ventilation space is supplied to the air conditioner, temperature of air taken in from the ventilation space that is not influenced by heat of the power unit is reduced when air cooling is performed, for example. As a result, waste of energy can be avoided.

The above-noted arrangement may have a construction in which the power unit includes a secondary battery and a battery management system for charging and discharging of the secondary battery; and a power cable connected to the secondary battery and a signal cable connected to the battery management system are provided within different pillars of a plurality of pillars of the cabin.

With this arrangement, since the power cable and the signal cable are provided within different pillars, each of the pillars would act as a shield and a distance between the power cable and the signal cable is increased. Thus, even if there is noise in the power cable, it is possible to reduce a chance that noise affects the signal cable, thereby to suppress erroneous operation.

The above-noted arrangement may have a construction in which the electric motor also functions as a generator; an engine is provided for transmitting drive power to the propelling transmission system and the electric motor; and a charge-discharge control section is provided for switching between a charging mode for charging electric power generated at the electric motor to the secondary battery of the power unit and a driving mode for supplying power from the power unit to the electric motor.

With this arrangement, since the charge-discharge control section achieves switching between the charging mode for charging electric power generated by the electric motor from drive power of the engine to the secondary battery and a driving mode for supplying power from the power unit to the electric motor and transmitting drive power of the electric motor to the propelling system, a hybrid vehicle can be provided.

A work vehicle according to the present invention comprises:

a power unit;

an electric motor activated by electric power from the power unit;

a power control unit for control electric power supplied from the power unit to the electric motor; and a propelling transmission system for receiving drive power from the electric motor, wherein the power control unit is arranged in a portion of a rear fender projecting outwardly from the propelling vehicle body to cover above a rear wheel.

The rear fender for covering above the rear wheel is positioned to be exposed to the outside of the vehicle body. A small space is defined between the rear fender and the rear wheel disposed under the rear fender, while a relatively large space can be secured above the rear fender. In such a construction in which the power control unit is provided in the portion of the rear fender, there is no need to secure space for arranging the power control unit within the vehicle, and further it is possible to cool the power control unit by bringing air from the outside of the vehicle body into direct contact with the power control unit.

Thus, not only an easy arrangement of the power control unit for controlling electric power supplied to the electric motor becomes possible, but also satisfactory air cooling can be achieved.

The above-noted arrangement may have a construction in which the power control unit is arranged in a position of the rear fender opposing to the rear wheel; and a limiting device is provided for preventing mud from entering the power control unit.

With this arrangement, the power control unit is arranged in a position of the rear fender opposing to the rear wheel, thereby to prevent the power control unit from projecting upward from the rear fender and allow space under the rear fender to be effectively used. Further, while the portion above the power control unit can be protected by the rear fender, the power control unit per se can be protected since the limiting device prevents mud from entering the power control unit.

The above-noted arrangement may have a construction in which the limiting device includes a case portion for housing the power control unit, a protection plate provided under the case portion and above the rear wheel, and a scraper projecting downward from the bottom surface of the protection plate.

With this arrangement, even if mud or pebbles splashed or flipped by the rear wheel is directed toward the power control unit, the pebbles are brought into contact with the protection plate, not brought into direct contact with the power control unit. Further, even if a clod of soil or straw is attached to the rear wheel to be brought into the interior of the rear fender, the scraper comes into contact with the clod or straw to scrape it off the rear wheel, which would not bring it into contact with the protection plate. Thus, the power control unit is protected by the protection plate and the scraper.

The above-noted arrangement may further include a duct for directing air in a space adjacent to the center of a vehicle body relative to the rear fender to the power control unit as cooling air, and a cooling fan for drawing air from the duct for supply to the power control unit.

With this arrangement, although the power control unit is provided in a circumstance where it is easily exposed to mud or dust, air in the space adjacent to the center of the vehicle body relative to the rear fender is supplied from the duct to the power control unit as cooling air, thereby to cool the power control unit without directing dust to the power control unit. This achieves more satisfactory air cooling in combination with the effect produced by the construction for allowing air from the outside of the vehicle body to directly contact the power control unit.

The above-noted arrangement may further include a supply cable for supplying electric power from the power unit to the power control unit, and an output cable for outputting electric power from the power control unit to the electric motor, the supply cable and the output cable extending from a side wall of the power control unit adjacent to the inner side of a vehicle body.

With this arrangement, since the supply cable and the output cable are led out of the side wall of the power control unit adjacent to the inner side of the vehicle body, they can be arranged so as not to be exposed to the interior of the rear fender and can be maintained in a condition free from damage.

A work vehicle according to the present invention comprises:

a power unit;

an electric motor activated by electric power from the power unit and including a rotor having a permanent magnet and coaxially connected to an output shaft of the engine, and a stator provided to surround the rotor;

a connecting mechanism for connecting the rotor and the flywheel in the mentioned order relative to the output shaft; and a housing for housing the electric motor and the flywheel, wherein the connecting mechanism includes a stud shaft extending parallel to the output shaft, and a nut screwed to a threaded portion formed at a shaft end of the stud shaft with the stud shaft extending through the rotor and the flywheel, and wherein t the rotor has a threaded bore having a female threaded portion formed in an inner surface thereof to allow a threaded shaft for adjusting feeding speed to perforate the rotor parallel to a rotational axis of the output shaft when the rotor is fed to the direction of the output shaft to be connected to the output shaft.

With this arrangement, in connecting the rotor of the electric motor to the output shaft of the engine, the threaded shaft having a sufficient length greater than the entire length of the threaded bore is used for adjusting feeding speed. The threaded shaft is screwed to the threaded bore of the rotor to allow the opposite ends of the threaded shaft to project from the threaded bore and bring the stud shaft mounted on the output shaft to perforate the rotor. In this state, a drawing force is applied between the rotor and the stator. However, since one of the ends of the threaded shaft comes into contact with the output shaft, the rotor is prevented from being displaced to a direction toward the output shaft (toward the direction along the rotational axis of the engine), and is prevented from being displaced to a direction toward the inner periphery of the stator (toward the direction perpendicular to the rotational axis of the engine) by the stud shaft. In this state, one of the ends of the threaded shaft is rotated to reduce the amount of projection of the other end of the threaded shaft from the rotor, thereby to shift the rotor with desired speed in the direction to move close to the output shaft of the engine while eliminating the influence of the drawing force exerted between the rotor and the stator. As a result, the rotor is guided to a proper position to connect the rotor and the flywheel to the output shaft through the connecting mechanism.

In this way, the rotor and the flywheel are connected to the output shaft of the engine through the connecting mechanism while the housing is provided, which allows the electric motor and the flywheel to be accommodated in the housing.

As a result, a vehicle is provided in which the rotor of the electric motor is easily connected to the output shaft of the engine while the electric motor and the flywheel are mounted within the housing.

The above-noted arrangement may further include a clutch mechanism mounted at a side of the flywheel facing away from the rotor for establishing and breaking power transmission.

With this arrangement, since the clutch mechanism can be provided using the surface of the flywheel facing away from the rotor, the number of parts forming the clutch mechanism can be reduced to miniaturize the clutch mechanism. In addition, even when abrasion filings are generated at the clutch mechanism, the flywheel restrains abrasion filings from entering the electric motor.

The above-noted arrangement may have a construction in which, as viewed from a direction along the rotational axis, a power line connected to a coil of the stator is provided on one lateral side of the housing, and a starter motor is provided on the other lateral side of the housing for transmitting a rotational force to a ring gear portion mounted in an outer circumference of the flywheel.

With this arrangement, the starter motor and the power line are distributed on the opposite lateral sides of the housing, thereby to allow lateral space around the housing to be effectively used compared with the arrangement in which the stator motor and the power line are provided in one lateral side of the housing.

A work vehicle according to the present invention comprises:
a power unit;
an electric motor activated by electric power from the power unit;
a power control unit for control electric power supplied from the power unit to the electric motor;
a propelling transmission system for receiving drive power from the electric motor; and
a transmission case for transmitting drive power from the electric motor to the propelling transmission system,
wherein an electric hydraulic pump unit is provided in an outer side portion of one lateral side of the transmission case to be activated by electric power from the power unit, the electric hydraulic pump unit being configured to draw lubrication oil of the transmission case for supply to a hydraulic device of a propelling vehicle body as pressure oil.

With this arranement, electric power from the power unit is supplied to activate the electric motor, and drive power of the electric motor is transmitted from the transmission case to the propelling transmission system, thereby to propel the vehicle. Further, since the electric hydraulic pump provided in one lateral side of the transmission case is configured to supply lubrication oil of the transmission case to the hydraulic device of the propelling vehicle body as pressure oil, an oil passage for supplying pressure oil from the transmission case to the electric hydraulic pump can have an extremely short length.

Thus, a vehicle is provided in which the hydraulic system can be miniaturized by the relative relationship between the transmission case for receiving drive power of the electric motor and the electric hydraulic pump.

The above-noted arrangement may have a construction in which a hydraulic filter is provided in an outer side portion of the other lateral side of the transmission case facing away from the outer side portion of the one lateral side in which the electric hydraulic pump unit is arranged, the hydraulic filter being configured to filter lubrication oil supplied to the electric hydraulic pump unit.

With this arrangement, while it is possible to supply lubrication oil of the transmission case to the electric hydraulic pump, even when a large-sized filter is used, the hydraulic filter would not interfere with the electric hydraulic pump, thereby to provide the hydraulic system by effectively using the opposite lateral side space of the transmission case.

The above-noted arrangement may have a construction in which an inner oil passage is formed separately from an interior space of the transmission case for directing lubrication oil filtered by the hydraulic filter to the electric hydraulic pump unit.

With this, pressure oil having filtered at the hydraulic filter disposed at one lateral side of the transmission case can be supplied to the electric hydraulic pump disposed in the other side of the transmission case through the inner oil passage. This dispenses with an operation for providing pipework in the outside of the transmission case, which facilitates the assembly of the hydraulic system.

The above-noted arrangement may have a construction in which the electric hydraulic pump unit includes a first hydraulic pump unit provided at a forward position in the outer side portion of the one lateral side of the transmission case for supplying pressure oil to a steering unit for steering front wheels as the hydraulic device, and a second hydraulic pump unit provided rearwardly of the first hydraulic pump unit for supplying pressure oil to an elevation actuator for vertically moving a work implement at a rear portion of a vehicle body as the hydraulic device.

With this arrangement, since pressure oil of the first hydraulic pump unit provided in the forward position is supplied to the steering unit for the front wheels while pressure oil of the second hydraulic pump unit provided in the rearward position is supplied to the elevation actuator provided in the rear portion, an oil passage defined between the first hydraulic pump unit and the steering unit can have a reduced dimension while an oil passage defined between the second hydraulic pump unit and the elevation actuator can have a reduced dimension, which achieves miniaturization of the hydraulic system. In particular, since the first hydraulic pump unit and the second hydraulic pump unit are provided independently of each other, it is possible to activate only one of the pump units when pressure oil is needed. As a result, wasteful driving can be suppressed all the more.

The above-noted arrangement may have a construction in which the first hydraulic pump unit includes a first pump motor activated by electric power and a first pump driven by the first pump motor, while the second hydraulic pump unit includes a second pump motor activated by electric power and a second pump driven by the second pump motor, and wherein the first pump is arranged rearwardly of the first pump motor, the second pump is arranged forwardly of the second pump motor, and a distribution valve is arranged in an intermediate position between the first pump and the second pump for distributing pressure oil from the first pump or the second pump.

With this arrangement, the first pump, the second pump and the distribution valve are disposed in the intermediate position between the first pump motor and the second pump motor. Thus, even when the propelling vehicle body is propelled forward in an environment where trees and plants or obstacles projecting from the ground are present, the first pump motor comes into contact with the trees and plants or the projecting obstacles to remove them, which eliminates a disadvantage that any of the first pump, the second pump and the distribution valve will be damaged by contacting those trees and plants or the obstacles. Reversely, when the propelling vehicle body is propelled backward, the second pump motor comes into contact with the trees and plants or the projecting obstacles to remove them, which eliminates the disadvantage that any of the first pump, the second pump and the distribution valve will be damaged by contacting those tress and plants or the obstacles.

The above-noted arrangement may have a construction in which a device functioning as a generator is used as the electric motor, a secondary battery is provided in the power unit, and an engine is provided for transmitting drive power to the propelling transmission system and the electric motor, and wherein a charge-discharge control section is provided for switching between a charging mode for charging electric power generated at the electric motor to the secondary battery of the power unit and a driving mode for supplying power from the power unit to the electric motor.

With this arrangement, the charge-discharge control section achieves switching between the charging mode for charging electric power generated at the electric motor to the secondary battery of the power unit and a driving mode for supplying electric power from the secondary battery to the electric motor and transmitting drive power from the electric motor to the propelling system, thereby to provide a hybrid-type vehicle.

MODE FOR CARRYING OUT THE INVENTION

An embodiment of the present invention will be described hereinafter in reference to the accompanying drawings.
[Overall Construction]

Figure 1:
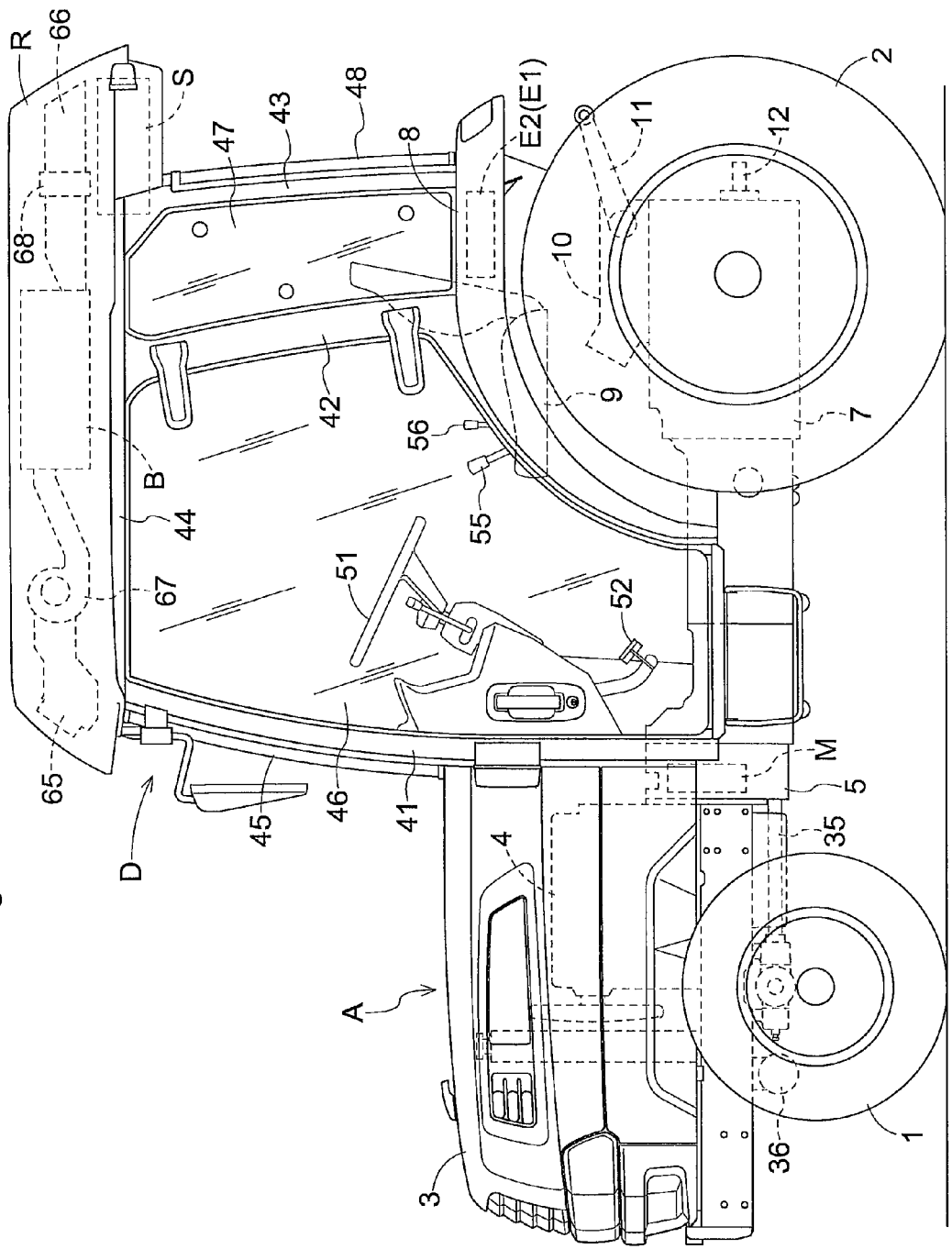
FIG. 1 is an overall side view of a tractor.

As shown in FIG. 1, a hybrid-type tractor acting as a work vehicle comprises a propelling vehicle body A including a pair of right and left front steerable wheels 1 and a pair of right and left rear wheels 2, an engine hood 3 mounted forwardly of the propelling vehicle body A and having a diesel-type engine 4 therein, a transmission housing 5 mounted in a rear side of the engine 4 for accommodating a generator motor M (an example of an electric motor) and a main clutch mechanism C, a transmission case 7 connected to a rear surface of the transmission housing 5, right and left rear fenders 8 provided rearwardly of the propelling vehicle body A to project laterally outwardly from the propelling vehicle body A to cover above the right and left rear wheels 2, a driver's seat 9 provided between the right and left rear fenders 8, and a cabin D providing a driving space including the driver's seat 9.

The tractor further comprises a hydraulic elevation cylinder 10 acting as an elevation actuator and a pair of right and left lift arms 11 vertically movable by action of the elevation cylinder 10, both of which are mounted rearwardly of the propelling vehicle body A (at a rear end side of the transmission case 7), and a power take-off shaft 12 provided in a rear end of the transmission case 7 for taking drive power to the outside. Such an arrangement makes it possible to connect a ground work implement including a rotary tiller device or a plow device to the tractor through a three-point link mechanism (not shown) vertically movable by the right and left lift arms 11, in which drive power is transmitted from the power take-off shaft 12 to the driven-type ground work device such as the rotary tiller device to perform cultivating operations.

In this tractor, the generator motor M has both of a function of a three-phase AC generator for generating electric power by drive power of the engine 4, and a function of a three-phase AC motor rotated by electric power supplied from the outside. A power unit B (see FIGS. 8 and 15) is provided in the interior of a roof portion R of the cabin D, including a secondary battery 59 such as a lithium-ion type or nickel-hydrogen type, for example, and a battery management system 60 (an example of battery management means; BMS). A first power control unit E1 is provided under the right rear fender 8 for converting DC power from the power unit B to three-phase AC power to for supply to the generator motor M, and a second power control unit E2 is provided under the left rear fender 8 for driving a hydraulic system. Further, a main control system is provided under the driver's seat 9 for achieving control for converting three-phase alternating current generated at the generator motor M to direct current for pressure rising and supply to the power unit B, and control for the first and second power control units E1 and E2. It should be noted that the term "power control unit E" is used for representing a superordinate concept of the first and second power control units E1 and E2.

[Main Control System]

Figure 15:
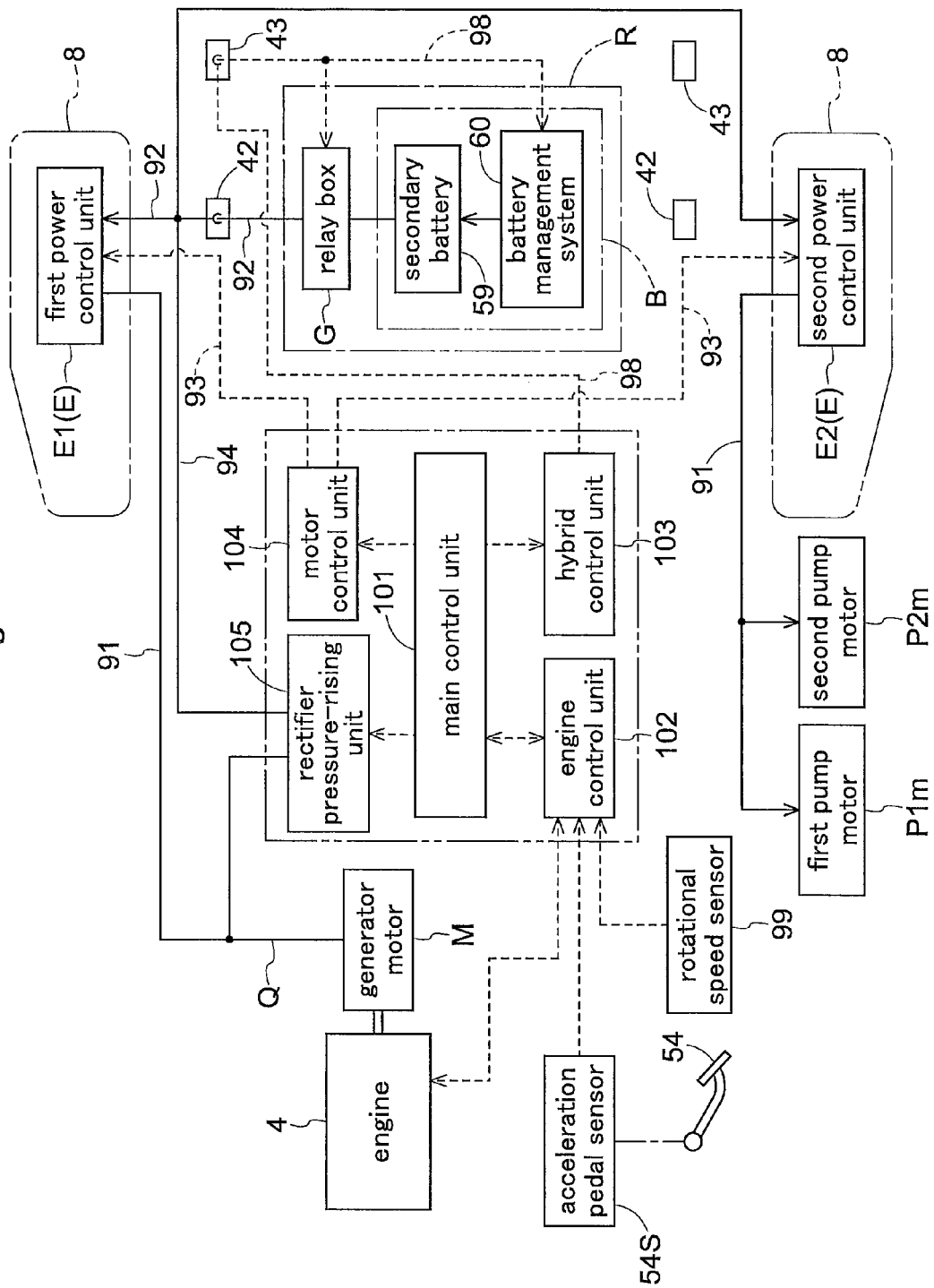
FIG. 15 is a circuit diagram of a control system for charging or discharging power.

As shown in FIG. 15, the main control system includes a main control unit 101, an engine control unit 102, a hybrid control unit 103, a motor control unit 104, and a rectifier pressure-rising unit 105, all of which are formed as an ECU as a whole. The main control system serves as a charge-discharge system for selecting a charging mode for charging power generated at the generator motor M to the secondary battery 59 of the power unit B when a load applied to a propelling transmission system is small, and selecting a driving mode for converting power from the power unit B to three-phase alternating current at the first power control unit E1 for supply to the generator motor M when the load applied to the propelling transmission system exceeds a threshold value. In the driving mode, drive power from the generator motor M is transmitted to the propelling transmission system to assist engine rotation, thereby to achieve a traveling condition free from power shortage or engine stop. Incidentally, the propelling transmission system represents a transmission mechanism of the transmission case 7, for example, having a function of transmitting drive power of the engine 4 to the front wheels 1 and the rear wheels 2. Details of the transmission case 7 and a control system will be described later.

[Transmission Housing]

Figure 2:
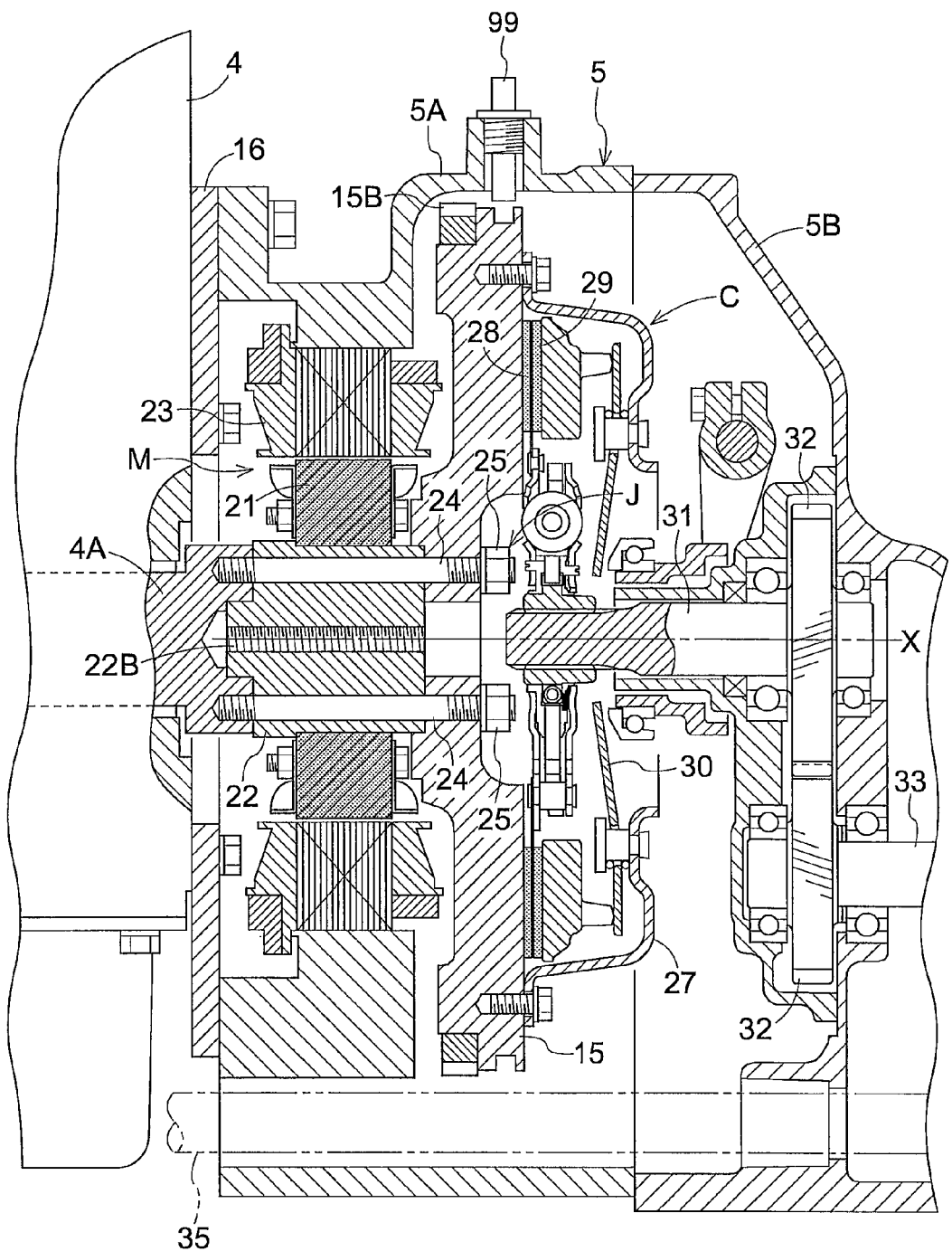
FIG. 2 is a sectional view showing a construction of the interior of a transmission housing.

As shown in FIG. 2, the engine 4, the generator motor M, a flywheel 15, and the main clutch mechanism C are provided in the mentioned order. The above-noted transmission housing 5 is connected to a rear-end plate 16 connected to the rear portion of the engine 4 for housing the generator motor M, flywheel 15, and main clutch mechanism C.

The generator motor M includes a rotor 22 provided with a permanent magnet 21 in an outer periphery thereof, and a stator 23 provided to surround the rotor 22. The stator 23 is formed from a stator core with a coil being wound around a plurality of toothed portions (not shown). The rotor 22 of the generator motor M is connected to a shaft end of an output shaft (crank shaft) 4A of the engine 4 to be coaxially with a rotational axis X of the output shaft 4A. The flywheel 15 is mounted on a surface of the rotor 22 facing away from the output shaft 4A. Those elements are connected by a connecting mechanism J. In this arrangement, the rotor 22 is formed as a transmission section having a function of transmitting drive power from the generator motor M to the propelling transmission system and a function of transmitting drive power of the engine 4 to the generator motor M.

The connecting mechanism J includes a plurality of stud shafts 24 extending parallel to the rotational axis X of the output shaft 4A and extending through rotor through bores 22A formed in the rotor 22 and wheel through bores 15A formed in the flywheel 15, and nuts 25 screwed to threaded portions 24A formed at shaft ends of the stud shafts 24. With this arrangement, those elements are connected together with the rotor 22 and flywheel 15 being held between the shaft end of the output shaft 4A and the nuts 25.

The transmission housing 5 includes a front housing 5A and a rear housing 5B separable from the front housing 5A. In assembling the generator motor M, the front housing 5A with the stator 23 provided therein is connected to the rear-end plate 16, and then the rotor 22 is connected to a rear end of the output shaft 4A.

In order to avoid a disadvantage that the rotor 22 is stick to an inner surface of the stator 23 by a drawing force of the permanent magnet 21 of the rotor 22 in the above-noted assembling operation, the plurality of stud shafts 24 are provided, while a threaded bore 22B having female threads in an inner surface thereof is formed to perforate the rotor 22 parallel to the rotational axis X (coaxially with the rotational axis X in the drawings).

Figure 3:
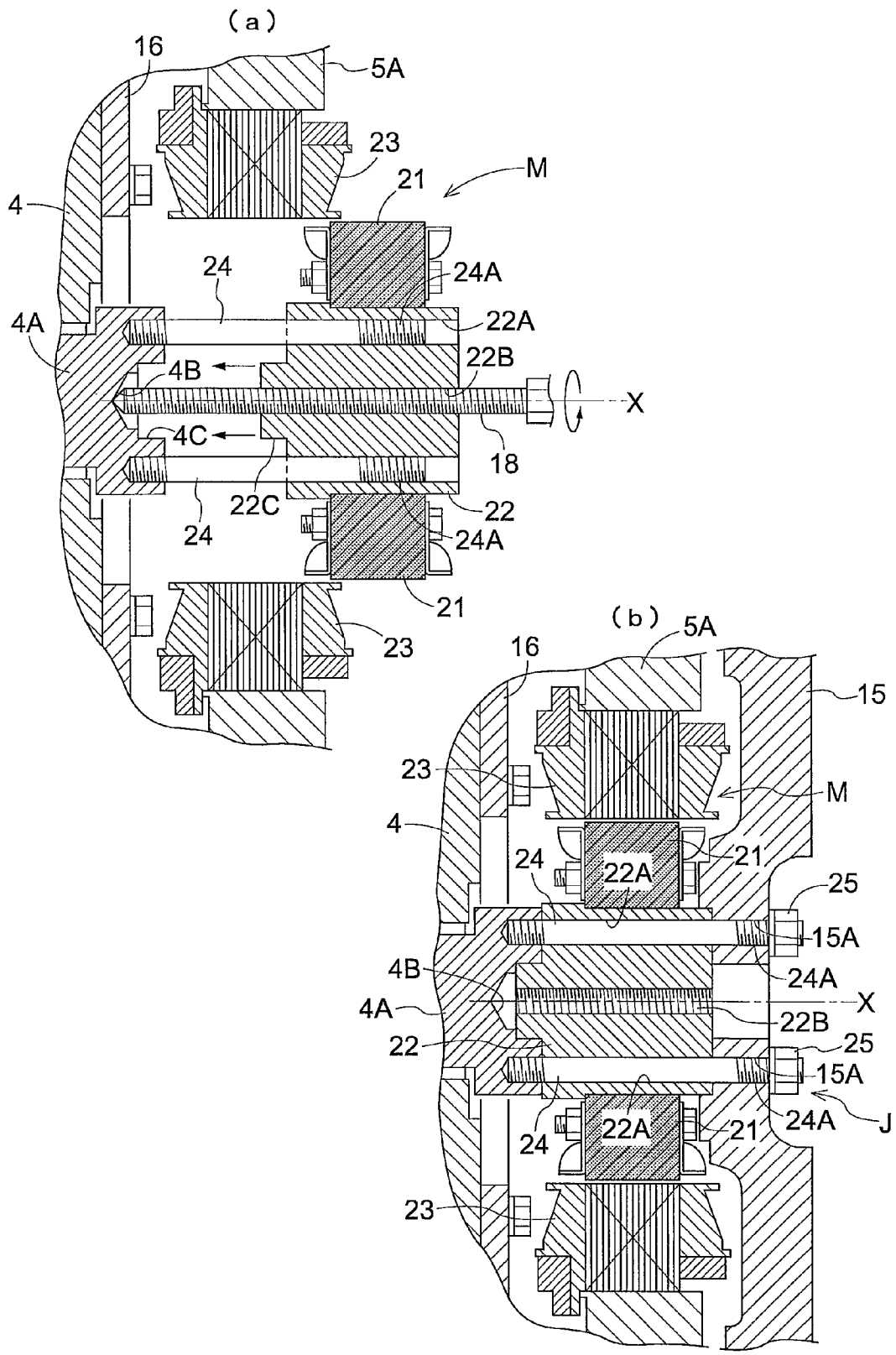
FIG. 3A is a sectional view showing a process of connecting a rotor to an output shaft of an engine.
FIG. 3B is a sectional view showing a process of connecting a rotor to an output shaft of an engine.

The threaded bore 22B is provided with a male thread portion to which a threaded shaft 18 is screwed for adjusting feeding speed. When the rotor 22 is connected to the output shaft 4A, as shown in FIG. 3A, the plurality of stud shafts 24 are inserted through the rotor through bores 22A of the rotor 22 with a distal end of the threaded shaft 18 being screwed to and projecting from the rotor 22, and then the conical distal end of the threaded shaft 18 is fitted into a conical recess 4B formed in the rear surface of the output shaft 4A to align with the rotational axis X. In this state, the threaded shaft 18 is rotated in a direction to be removed from the rotor 22, thereby to gradually reduce a distance between the rotor 22 and the rear end of the output shaft 4A by the drawing force to draw the permanent magnet 21 to the stator 23. When the rotor 22 reaches a position to come into contact with the rear end of the output shaft 4A by the above-noted operation, a gap is defined between the outer periphery of the rotor 22 and an inner periphery of the stator 23. Then, as shown in FIG. 3B, the plurality of stud shafts 24 are inserted into the wheel through bores 15A of the flywheel 15, and the nuts 25 are screwed and fastened to the stud shafts 24, thereby to connect the rotor 22 to the flywheel 15.

Further, a concave fitted portion 4C is formed in a central position of the rear surface of the output shaft 4A to be coaxial with the rotational axis X, while a convex fitting portion 22C is formed in a front surface of the rotor 22. In connecting the rotor 22 to the output shaft 4A, the fitted portion 4C is fitted on the fitting portion 22C to be rigidly positioned.

The main clutch mechanism C includes a clutch cover 27 connected to the rear surface of the flywheel 15 housing a clutch disk 28, a pressure plate 29 and a diaphragm spring 30; a clutch shaft 31 for receiving drive power from the clutch disk 28; and a release unit (not shown) for disengaging the main clutch mechanism C in response to a depressing operation of a clutch pedal 52 shown in FIG. 1.

The clutch shaft 31 is rotatably supported to the rear housing 5B about the rotational axis X. The clutch disk 28 is supported to be shiftable along the rotational axis X for transmitting torque to the clutch shaft 31 through a splined structure. The diaphragm spring 30 exerts an urging force acting toward a clutch-engaging direction on the clutch disk 28 through the pressure plate 29. Further, a transmission system is provided in the rear housing 5B for transmitting drive power from the rear end of the clutch shaft 31 to an intermediate transmission shaft 33 through a transmission gear 32. Drive power from the intermediate transmission shaft 33 is transmitted to the transmission case 7.

In the main clutch mechanism C, when the clutch pedal 52 is in a non-operated state (not depressed), the urging force of the diaphragm spring 30 is exerted on the clutch disk 28 from the pressure plate 29 to bring the clutch disk 28 to pressure contact the rear surface of the flywheel 15 to maintain the clutch-engaging state. On the other hand, when the clutch pedal 52 is depressed, the urging force exerted on the pressure plate 29 from the diaphragm spring 30 is drastically reduced to bring the clutch disk 28 out of contact with the rear surface of the flywheel 15 to reach the clutch-disengaging state.

Figure 4:
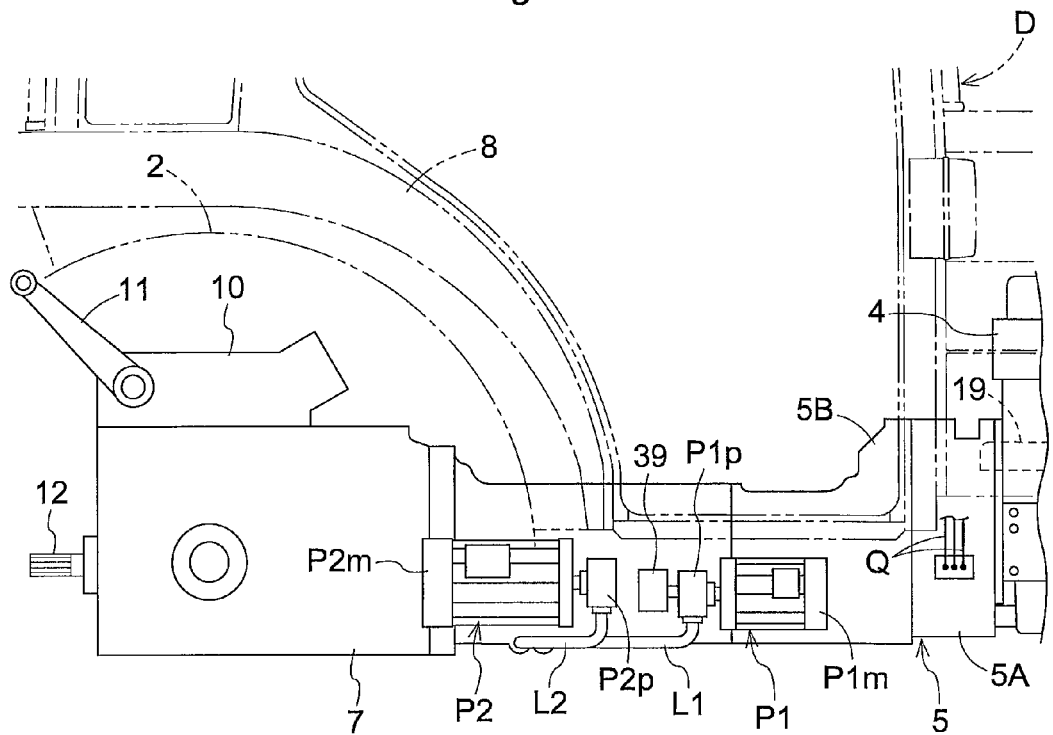
FIG. 4 is a side view showing a position of an electric hydraulic pump unit.
Figure 5:
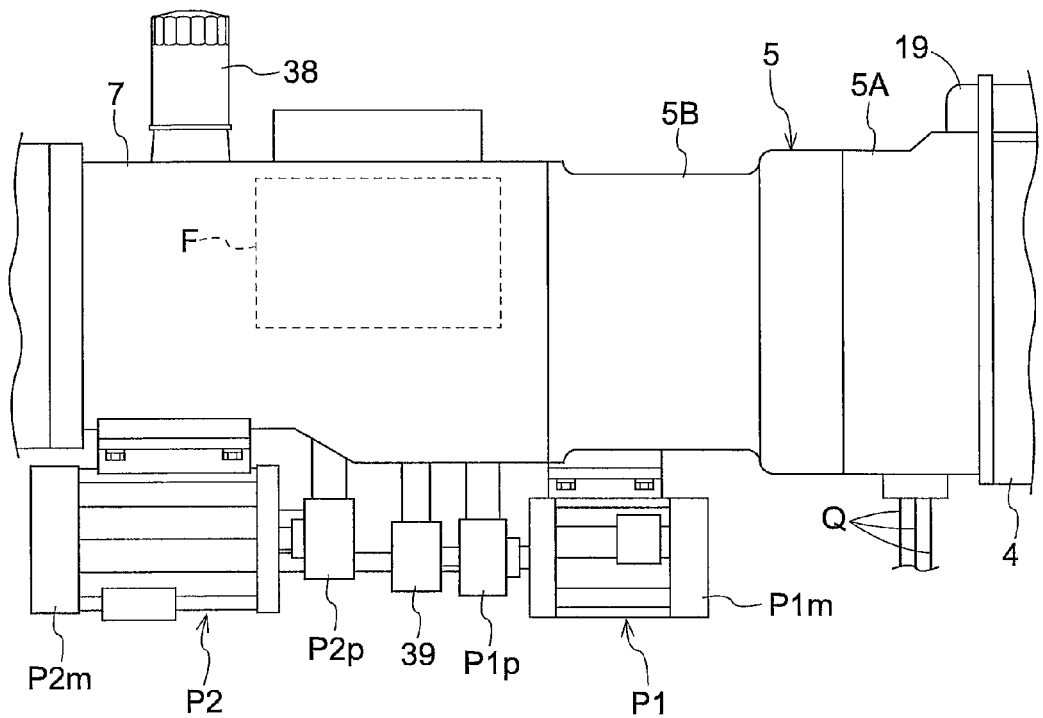
FIG. 5 is a top plan view showing positions of the electric hydraulic pump unit and a hydraulic filter.

A ring gear portion 15B is formed on an outer periphery of the flywheel 15. As shown in FIGS. 4 and 5, on the left side of the engine 4a is mounted a starter motor 19 having a pinion gear (not shown) screwed to the ring gear portion 15B for transmitting a rotational force. To the right side of the transmission housing 5 are connected three power lines Q connected to the coil of the stator 23 of the generator motor M. Those power lines Q function as passages for receiving power from the power control unit E described later and also function as passages for feeding power generated at the generator motor M. In the tractor of the present case, the starter motor 19 may be arranged on the right side of the engine 4 while the power lines Q may be arranged on the left side of the transmission housing 5.

[Function and Effect of Construction Relating to Generator Motor]

With the above arrangement, when the rotor 22 of the generator motor M is connected to the output shaft 4A of the engine 4, the threaded shaft 18 for adjusting feeding speed should have a length sufficiently greater than the entire length of the threaded bore 22B of the rotor 22. The threaded shaft 18 is screwed to the threaded bore 22B with opposite ends of the threaded shaft 18 projecting from the threaded bore 22B to allow the stud shafts 24 provided in the output shaft 4A to extend through the rotor through bores 22A of the rotor 22. In this state, while a drawing force is applied between the rotor 22 and the rotor through bores 22A, one of the ends of the threaded shaft 18 conies into contact with an inner surface of the recess 4B of the output shaft 4A, thereby to restrict displacement of the rotor 22 in a direction to move close to the output shaft 4A (direction along the rotational axis X). Displacement of the stud shafts 24 in a direction to move close to the inner surface of the stator of the rotor 22 (direction perpendicular to the rotational axis X) is also restricted.

In this state, one of the ends of the threaded shaft 18 is rotated through a manual rotating operation or an electric actuator to reduce the amount of projection of the other end of the threaded shaft 18 from the rotor 22, thereby to allow the rotor 22 to shift in a direction to move close to the output shaft 4A of the engine 4 while eliminating the influence of the drawing force exerted between the rotor 22 and the stator 23. As a result, the rotor 22 is guided to a proper position to connect the rotor 22 and the flywheel 15 to the output shaft 4A through the connecting mechanism J. The threaded shaft 18 is removed after the rotor 22 is guided to the proper position.

In addition, the main clutch mechanism C can be miniaturized without increasing the number of parts by using the surface of the flywheel 15 facing away from the output shaft 4A. With this, even when abrasion filings are generated at the main clutch mechanism C, the flywheel 15 restrains abrasion filings from entering the generator motor M to maintain high operational performance.

Further, the starter motor 19 is provided in one lateral side of the transmission case 5 while the three power lines Q connected to the coil of the stator 23 of the generator motor M are provided in the other lateral side of the transmission housing 5 in a distributable way, thereby to allow lateral space around the transmission housing 5 to be effectively used.

[Transmission Case]

As shown in FIG. 5, a hydraulic speed-change unit F is built in the transmission case 7. A transmission system is provided for transmitting propelling drive power that has been speed-changed at the hydraulic speed-change unit F to the front wheels 1 and the rear wheels 2 from the transmission case 7.

Although not shown in the drawings, the hydraulic speed-change unit F includes a hydraulic speed-change clutch for establishing and breaking power transmission from the engine 4, a plurality of speed-change gears of synchromesh type, a plurality of hydraulic speed-change cylinders for shifting sleeves of the respective speed-change gears, and a speed-change valve for controlling the speed-change cylinders.

The hydraulic speed-change unit F provides a construction for achieving gear change only by operating .a main shift lever 55 (see FIG. 1) without depressing the clutch pedal 52, only through a hydraulic circuit. For example, when the main shift lever 55 is shifted from a neutral position to a forward first speed position, the speed-change clutch is disengaged and then the speed-change gear corresponding to the forward first speed position is brought to a speed-change position by action of the speed-change cylinders. Then, control for returning the speed-change clutch to the engaged position is sequentially performed by hydraulic pressure.

Propelling drive power from the hydraulic speed-change unit F is transmitted to the right and left rear wheels 2 through a rear differential mechanism (not shown) mounted within the transmission case, while drive power from a front-wheel acceleration device (not shown) mounted within the transmission case 7 is transmitted to a differential mechanism for the front wheels 1 (not shown) through a front-wheel drive shaft 35. The front-wheel acceleration device includes a gear speed-change system for increasing driving speed of the front wheels 1 when the front wheels 1 are steered exceeding a predetermined angle, and a hydraulic AD clutch 35C shown in FIG. 7. The AD clutch 35C is configured to maintain a driving state in which the front wheels 1 are driven at the same speed as the rear wheels 2 by an urging force of a spring when the propelling vehicle body A travels straight, and switched to a high-speed transmission state when the steering amount exceeds a predetermined value.

[Hydraulic System]

Figure 7:
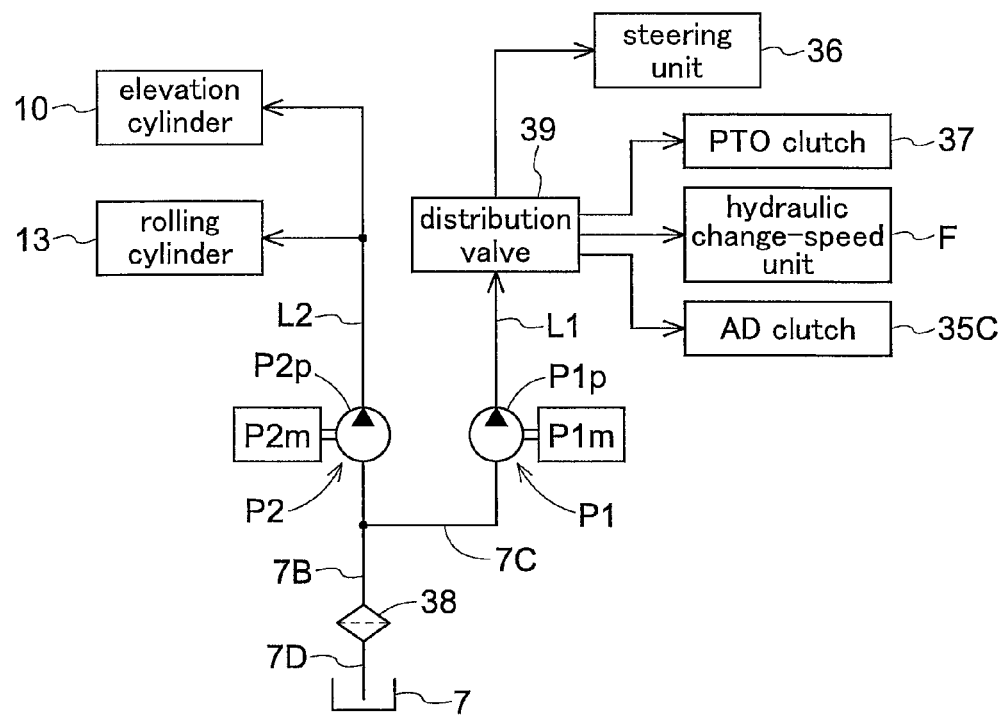
FIG. 7 is a hydraulic circuit diagrammatically showing a construction of a hydraulic system.

As shown in FIG. 1, a hydraulic steering unit 36 is mounted forwardly of the transmission case 7 in a further forward position of the engine 4 for steering the front wheels 1. As shown in FIG. 7, an example of a hydraulic system is formed from the steering unit 36, the elevation cylinder 10, a PTO clutch 37, and the AD clutch 35C. As shown in FIGS. 4 and 5, a first hydraulic pump unit P1 is mounted at a forward position in an outside portion of the right side of the transmission case 7 under a step of the cabin D for supplying pressure oil to the above-noted devices, and a second hydraulic pump unit P2 is linearly arranged in a rearward position of the first pump unit. A hydraulic filter 38 is attached to an outside portion of the left side of the transmission case 7 for filtering lubrication oil to be supplied to the first hydraulic pump unit P1 and the second hydraulic pump unit P2 as pressure oil. The first hydraulic pump unit P1 and the second hydraulic pump unit P2 constitute an electric hydraulic pump unit operable by electric power from the power unit B. A relative positional relationship is established in which the bottom surfaces of the first hydraulic pump unit P1 and the second hydraulic pump unit P2 are positioned above the bottom surface of the transmission case 7.

The first hydraulic pump unit P1 includes a first pump motor P1m operable by electric power, and a first pump P1p driven by the first pump motor. Similarly, the second hydraulic pump unit P2 includes a second pump motor P2m operable by electric power, and a second pump P2p driven by the second pump motor. The first pump motor P1m has a drive shaft projecting rearward to which the first pump P1p is connected, while the second pump motor P2m has a driving shaft projecting forward to which the second pump P2p is connected. A distribution valve 39 is arranged in an intermediate position between the first pump P1$p$ and the second pump P2$p$ for distributing and feeding pressure oil from the first pump P1$p$. In particular, the axis of the drive shaft of the first pump motor P1$m$ and the axis of the drive shaft of the second pump motor P2$m$ are positioned parallel to each other and close to each other in a vertical direction and a lateral direction of the vehicle body. This hydraulic system may be arranged to distribute pressure oil from the second hydraulic pump unit P2 at the distribution valve 39 instead of distributing pressure oil from the first hydraulic pump unit P1 at the distribution valve 39.

Both the first pump motor P1$m$ and the second pump motor P2$m$ act as three-phase motors, to which three-phase AC power is supplied from the second power control unit E1 The second hydraulic pump unit P2 feeds a large amount of pressure oil compared with the first hydraulic pump unit P1, and the second pump motor P2$m$ uses a large electric motor with large capacity compared with the first hydraulic pump unit P1. Pump motors for controlling rotational speed like a brushless direct-current motor may be used as the first pump motor P1$m$ and the second pump motor P2$m$.

Figure 6:
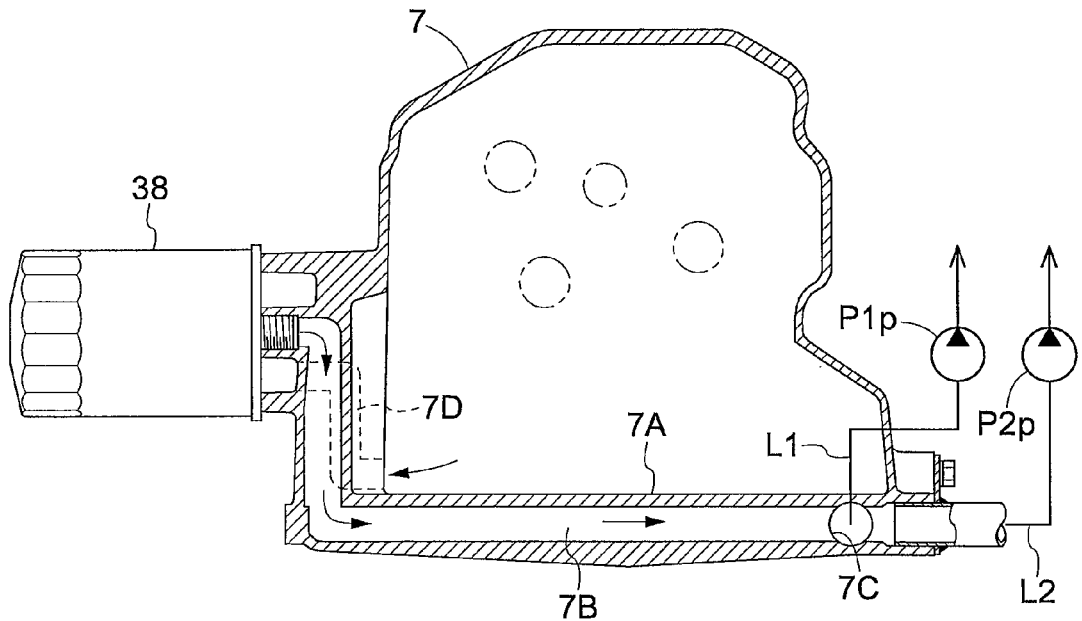
FIG. 6 is a sectional view showing an arrangement of the hydraulic filter and oil passages in a transmission case, for example.

As shown in FIG. 6, a main oil-feeding passage 7B (an example of inner oil-feeding passages) directed in the lateral direction of the vehicle body and separated from the interior space of the transmission case 7 is formed in a bottom wall portion 7A of the transmission case 7 to extend from one end to the other end of the bottom wall portion 7A. A branch oil-feeding passage 7C (an example of the inner oil-feeding passages) is formed to diverge from the main oil-feeding passage 7B in a longitudinal direction of the vehicle body, and a drawing oil-feeding passage 7D is formed in a wall portion of the transmission case 7 to supply lubrication oil reserved in the interior space of the case to the hydraulic filter 38. The transmission case 7 is a cast product, and the main oil-feeding passage 7B, the branch oil-feeding passage 7C and the drawing oil-feeding passage 7D are integrally formed with the transmission case 7 in time of casting.

Pressure oil from the main oil-feeding passage 7B is supplied to the second pump P2$p$ through a second oil-feeding pipe L2, while pressure oil from the branch oil-feeding passage 7C is supplied to the first pump P1$p$ through a first oil-feeding pipe L1.

As shown in FIG. 7, pressure oil from the first pump P1$p$ is supplied to the steering unit 36 for steering the front wheels 1 through the distribution valve 39 as well as to the PTO clutch 37 (a control valve of the PTO clutch 37, to be exact), the hydraulic speed-change unit F and the AD clutch 35C (a control valve of the AD clutch 35C, to be exact) through the distribution valve 39. On the other hand, pressure oil from the second pump P2$p$ is supplied to the elevation cylinder 10 (a control valve of the elevation cylinder, to be exact) mounted rearwardly of the propelling vehicle body A as well as to a rolling cylinder 13 (a rolling control valve, to be exact) for control a rolling posture of the ground work implement.

With the above-noted hydraulic system, the first pump motor P1$m$ of the first hydraulic pump unit P1 or the second pump motor P2$m$ of the second hydraulic pump unit P2 are operated when the hydraulic devices are actuated, thereby to avoid wasteful consumption of electric power when the hydraulic devices are not actuated. Further, since the two hydraulic pumps, that is, the first hydraulic pump unit P1 and the second hydraulic pump unit P2, are provided as electric hydraulic pump units in the outer side portion of one side of the transmission case 7, while the hydraulic filter 38 is provided in the outer side of the other side of the transmission case 7, not only the length of the oil passage between the transmission case 7 and each of the hydraulic pump units can be shortest to miniaturize the hydraulic system, but also the space at the opposite sides of the transmission case 7 can be effectively used to form the hydraulic system compared with the arrangement in which the hydraulic pump units and the hydraulic filter are provided in the outer portion of one side of the transmission case 7, for example.

Further, owing to the construction in which the first pump P1$p$, the second pump P2$p$ and the distribution valve 39 are provided in the intermediate space between the first pump motor P 1$m$ and the second pump motor P2$m$, when the propelling vehicle body A is propelled forward in an environment where trees and plants or obstacles projecting from the ground are present, the first pump motor P1$m$ comes into contact with the trees and plants or the projecting obstacles to remove them, which eliminates a disadvantage that any of the first pump P1$p$, the second pump P2$p$ and the distribution valve 39 will be damaged by contacting those tress and plants or the obstacles. Reversely, when the propelling vehicle body A is propelled backward, the second pump motor P2$m$ comes into contact with the trees and plants or the projecting obstacles to remove them, which eliminates the disadvantage that any of the first pump P1$p$, the second pump P2$p$ and the distribution valve 39 will be damaged by contacting those tress and plants or the obstacles.

While the hydraulic system in the present embodiment includes the two hydraulic pump units, that is, the first hydraulic pump unit P1 and the second hydraulic pump unit P2, as the electric hydraulic pump units, only one electric hydraulic pump unit or three or more electric hydraulic pump units may be provided instead. Further, the distribution valve 39 may be configured to distribute pressure oil to any other hydraulic device. The electric hydraulic pump units may be mounted on the left side of the transmission case 7 while the hydraulic filter 38 may be mounted on the right side of the transmission case 7. In addition, the positional relationship between the first hydraulic pump unit P1 and the second hydraulic pump unit P2 may be reversed to arrange the first hydraulic pump unit P1 in the rear side while arranging the second hydraulic pump unit P2 in the front side.

[Cabin]

The cabin D includes a pair of right and left front pillars 41 acting as struts in a front portion of the cabin, a pair of right and left intermediate pillars 42 acting as struts in a longitudinal intermediate portion of the cabin, a pair of right and left rear pillars 43 acting as struts in a rear portion of the cabin, a top frame 44 connected to those pillars at top portions thereof, and the roof portion R provided to cover the top frame 44. The cabin D further includes a windshield 45 provided to be held between the right and left front pillars 41 at the front portion of the cabin D, glass doors 46 provided between the front pillars 41 and the intermediate pillars 42 at opposite lateral sides of the cabin D, side glass panes 47 provided rearwardly of the glass doors 46 between the intermediate pillars 42 and the rear pillars 43, and a rear glass pane 48 provided to be held between the right and left rear pillars 43 at the rear portion of the cabin D. This construction employs steel material having a squared U-shape in cross section for the pair of right and left front pillars 41, pair of right and left intermediate pillars 42 and pair of right and left rear pillars 43. The top frame 44 is fixed to upper ends of those pillars by welding.

The cabin D has an airtight construction for preventing dust or noise from entering the driver's space from the outside. An air conditioner S is provided rearwardly of the roof portion R for heating or cooling the interior of the cabin D.

Figure 10:
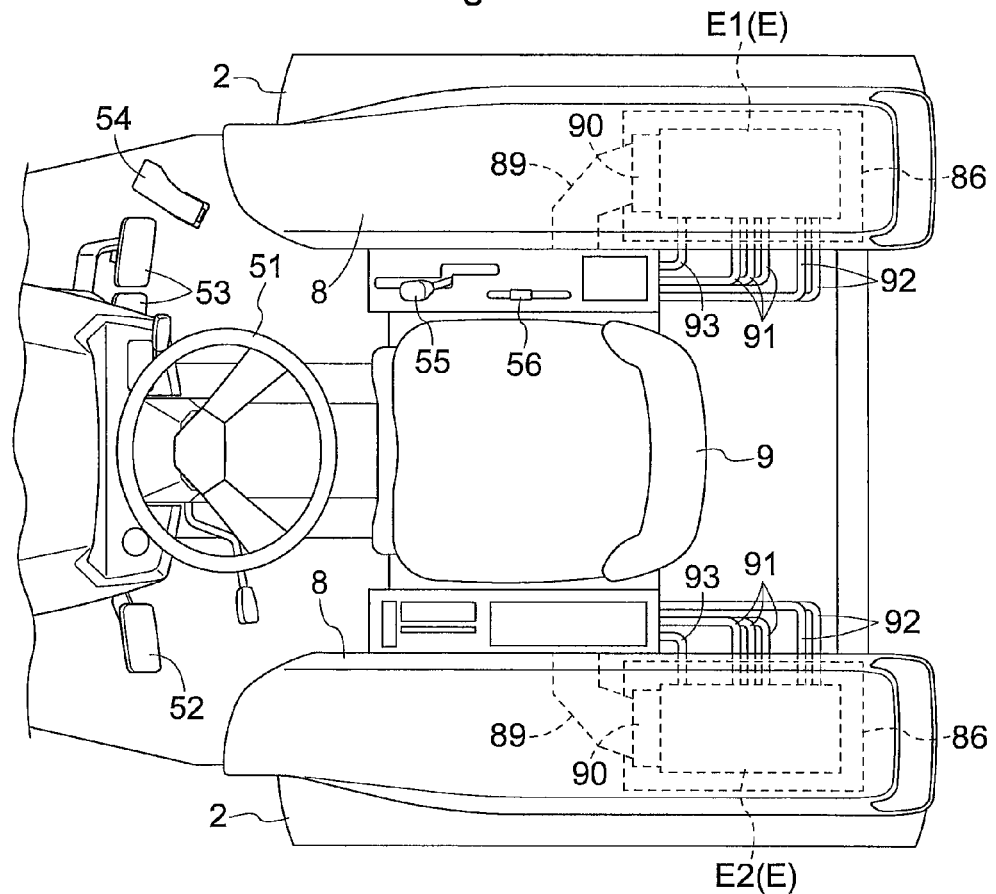
FIG. 10 is a top plan view of a rear portion of a tractor showing an arrangement of a power control unit.
Figure 11:
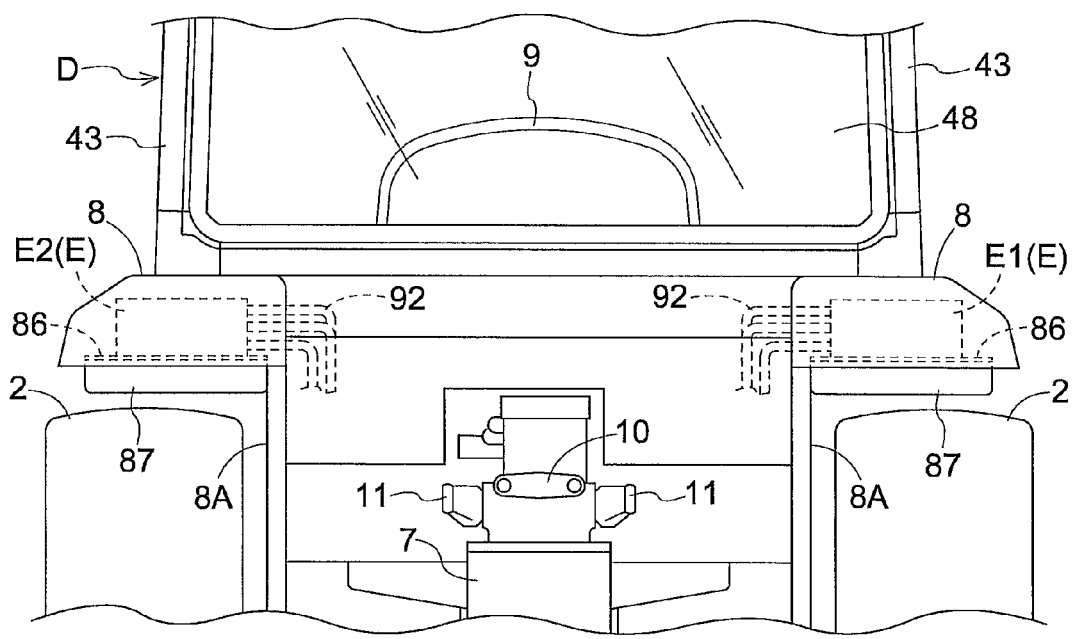
FIG. 11 is a rear view of the tractor showing the arrangement of the power control unit.
Figure 12:
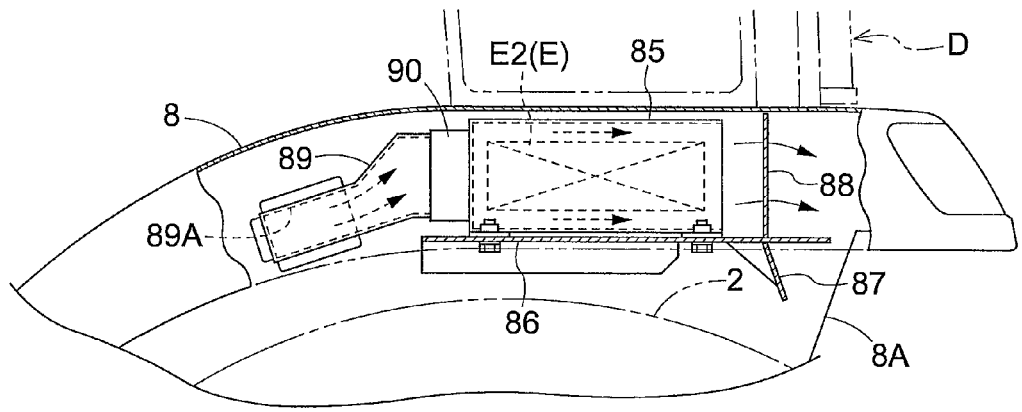
FIG. 12 a side view in vertical section of a rear fender showing the arrangement of the power control unit.
Figure 13:
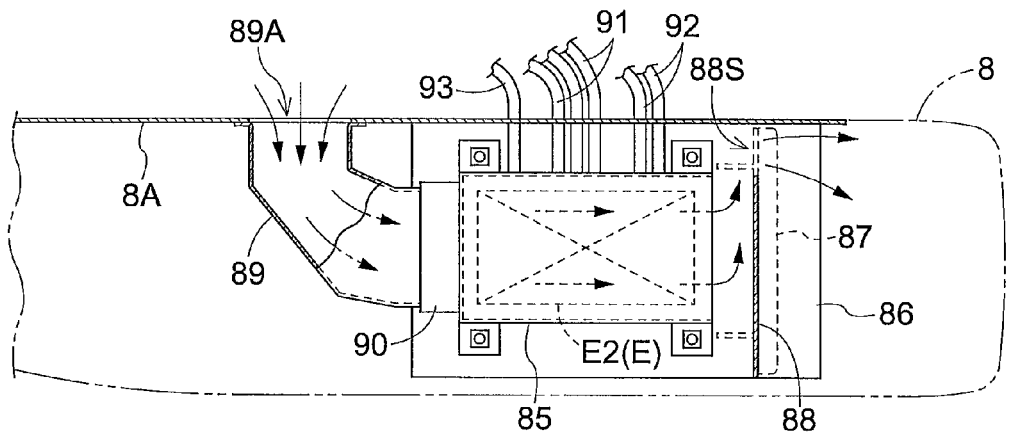
FIG. 13 is a top plan view in horizontal section of the rear fender showing the arrangement of the power control unit.
Figure 14:
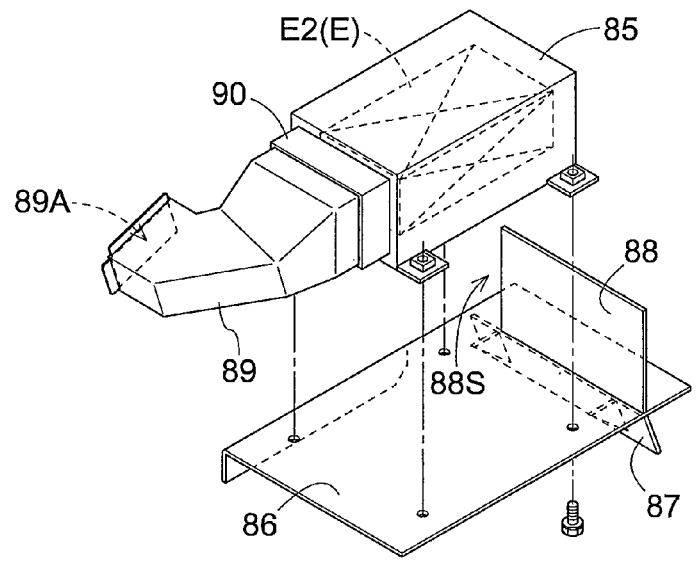
FIG. 14 is an exploded perspective view showing a case portion, a feeding duct and a protection plate.

As shown in FIGS. 1 and 10, in the interior of the cabin D are provided a steering wheel 51 at a front portion of the driver's seat 9 for steering the front wheels 1, the clutch pedal 52 under the steering wheel 51 on the left side thereof, and a pair of right and left brake pedals 53 as well as an acceleration pedal 54 under the steering wheel 51 on the right side thereof. Further, the main shift lever 55 and an elevation control lever 56 for controlling the elevation cylinder 10 are provided on a right side portion of the driver's seat 9.

[Cabin: Cooling System for Power Unit]

The power unit B provided in the roof portion R of the cabin D includes a cooling system for drawing air from the outside of the cabin for supply to the secondary battery 59 and the battery management system 60 as cooling air in order to suppress rise in temperature of the secondary battery 59.

Figure 8:
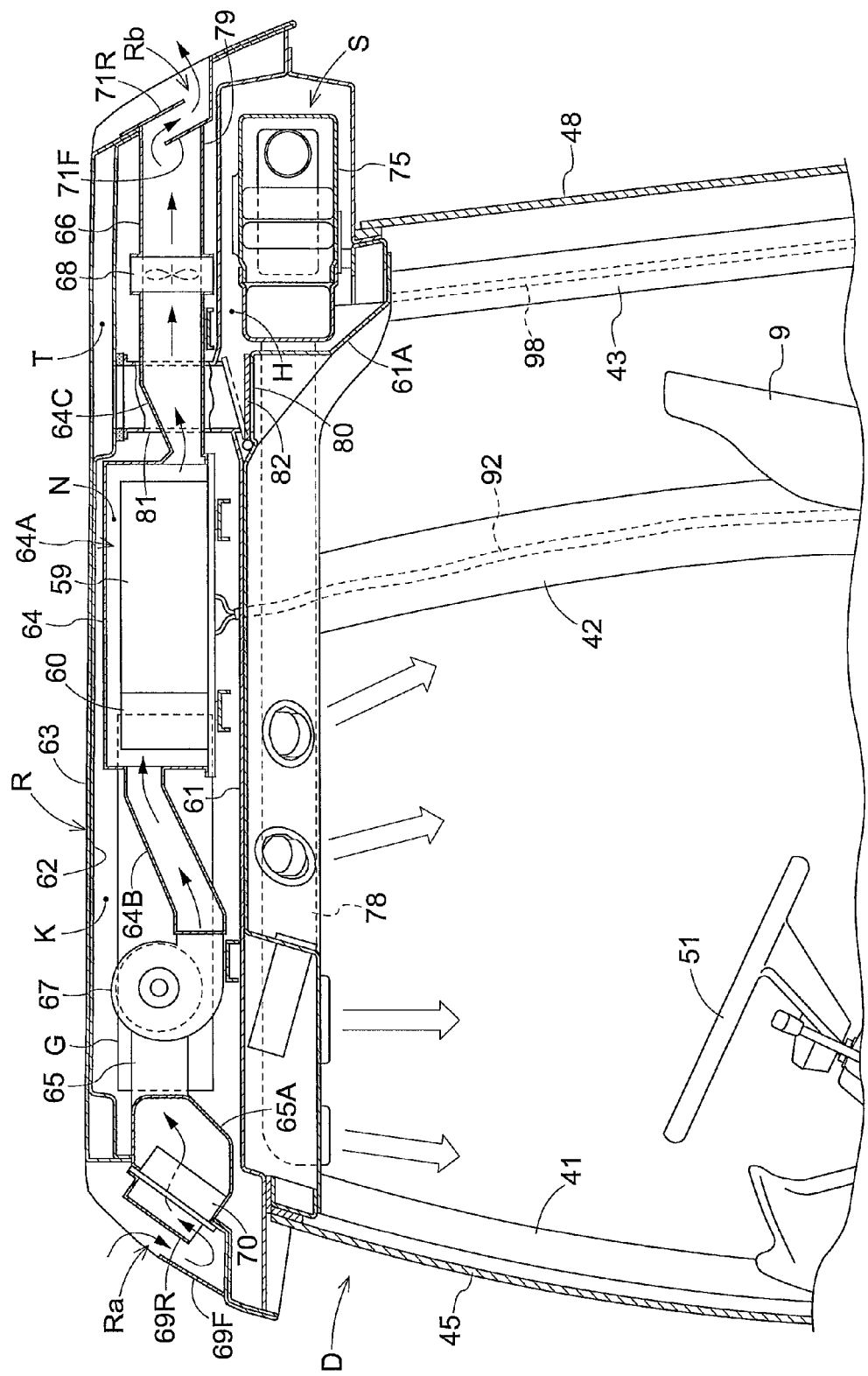
FIG. 8 is a side view in vertical section showing a construction of a roof portion of a cabin.
Figure 9:
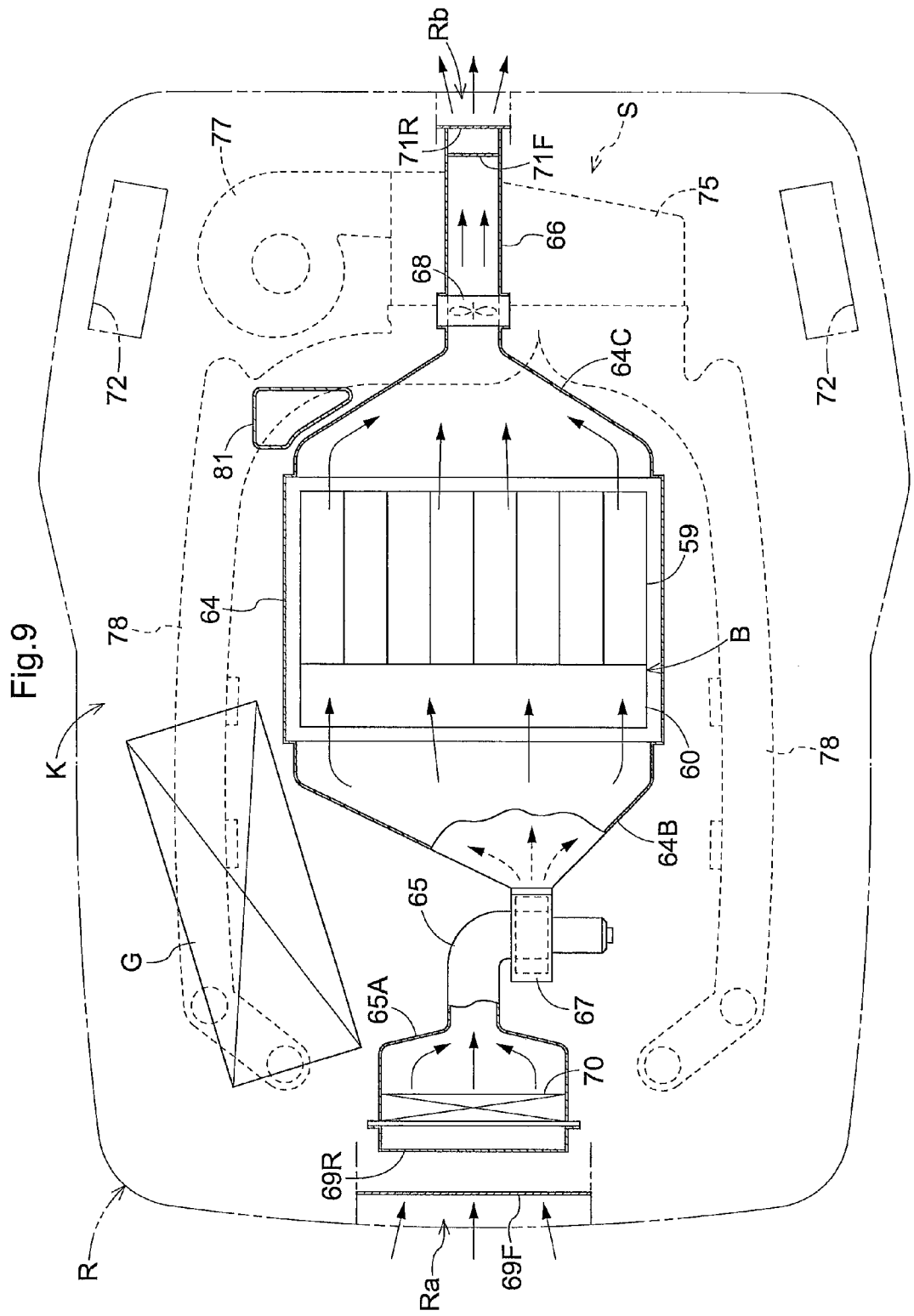
FIG. 9 is a top plan view in horizontal section showing a cooling system of a power unit.

As shown in FIGS. 8 and 9, the roof portion R includes a bottom wall 61 provided in the interior of the cabin to be supported to the top frame 44 and serving as a ceiling wall of the cabin, an upper wall 62 provided above the bottom wall 61, and an exterior wall 63 above the upper wall 62. A roof interior space K is defined between the bottom wall 61 and the upper wall 62 while a ventilation space T is defined between the upper wall 62 and the exterior wall 63. In this roof portion R, either of metal material and resin material may be used for the bottom wall 61 and the upper wall 62, while a blow-molded resin product should be used for the external wall 63 and the upper wall 62 in order to prevent the temperature in the ventilation space T and the roof interior space K from easily rising even under the circumstances with direct sunlight. It should be noted that it is sufficient that the ventilation space T is separated from a cooling space N within the roof portion R, and thus it may be formed in a lateral side portion or a rear portion of the roof portion R.

The secondary battery 59 of the power unit B includes a plurality of cells electrically connected together to serve as the battery, and mounted in a central portion longitudinally and transversely of the roof portion R. The battery management system 60 is provided in the vicinity of and forwardly of the secondary battery 59. The cooling space N is formed in the roof interior space K including a unit housing case 64 for housing the power unit B, an air-intake duct 65 for supplying air to the unit housing case 64 from the outside of the cabin, and an air-discharge duct 66 for feeding out air from the unit housing case 64 to the outside of the cabin. A front fan 67 is provided within the air-intake duct 65 to draw air from the outside of the cabin through the air-intake duct 65 and discharge the air to the outside of the cabin from the unit housing case 64 through the air-discharge duct 66, while a rear fan 68 is provided within the air-discharge duct 66. Further, a relay box G is provided to be separated from the cooling space N on one lateral side portion of and forwardly of the roof interior space K to be inclined inwardly of the vehicle body toward the forward portion of the vehicle body for selecting any of a plurality of resistors and exerting electric resistance to electric current supplied from the power unit B to the power control unit E.

The power unit B includes the secondary battery 59 and the battery management system 60 that are accommodated to be exposed in the interior of the unit housing case 64. Instead, the secondary battery 59 and the battery management system 60 may be housed in a box or the like so that such a box may be accommodated within the unit housing case 64. The unit housing case 64 has an introduction space 64B at a front end thereof with a cross section becoming smaller toward the upstream side in an air-flowing direction, and a discharge space 64C at a rear end thereof with a cross section becoming smaller toward the downstream side in the air-flowing direction.

The air-intake duct 65 has an air-intake portion 65A formed in a front end portion thereof to be laterally enlarged. The front fan 67 is provided in an intermediate portion of the air-intake duct 65 and has a discharging portion connected to a front end of the introduction space 64B of the unit housing case 64. An air-intake opening Ra is formed in a lateral central portion at a front end portion of the roof portion R for introducing air into the air-intake portion 65A. At a front end portion of the air-intake opening R are provided a front guide plate 69F projecting obliquely upward and rearward, and a rear guide plate 69R projecting obliquely downward and forward. An air filter 70 is provided in the air-intake portion 65A. In particular, an opening section (not shown) is formed in an intermediate region between the front guide plate 69F and the rear guide plate 69R to open downward for discharging rainwater or the like.

The front fan 67 uses a sirocco fan driven and rotatable about a transverse axis, while the rear fan 68 uses an axial-flow fan driven and rotatable about a longitudinal axis. It should be noted that only one of the front fan 67 and the rear fan 68 may be provided to act as a fan for drawing ambient air into the cooling space N.

The air-discharge duct 66 has a front end connected to a rear end of a battery housing space 64A of the unit housing case 64, and a rear end connected to an air-discharging opening Rb formed in a lateral central portion of the rear end portion of the roof portion. The air-discharging opening Rb is provided with a front discharge guide plate 71F projecting obliquely upward and forward, and a rear discharge guide plate 71R projecting obliquely downward and rearward.

With this arrangement, when the front fan 67 and the rear fan 68 are driven to draw ambient air into the cooling space N, air having passed above the front guide plate 69F circulates around a lower end of the rear guide plate 69R to pass the air filter 70 for removal of dust and then flow into the air-intake duct 65, as shown in FIG. 8. Since the power unit B is disposed in the roof interior space K within the roof portion R, rainwater would not be brought into direct contact with the power unit B. When ambient air is introduced, even under the circumstances in which rainwater or dust may enter the air-intake opening Ra, rainwater or dust is discharged downward from the opening section (not shown) and prevented from being drawn to the air-intake duct 65. Thus, it is avoided that rainwater or dust may enter the cooling space N to attach to the secondary battery 59.

Air drawn into the air-intake duct 65 comes into contact with outer surfaces of the secondary battery 59 and the battery management system 60 accommodated in the battery housing space 64A of the unit housing case 64 to take away heat, thereby to suppress rise in temperature of the secondary battery 59. Air that has taken away heat in such a manner is directed to the air-discharging opening Rb from the air-discharge duct 66, and passes above the front discharge guide plate 71F to circulate a lower side of the rear discharge guide plate 71R to be discharged to the outside of the roof portion R. Owing to the rear discharge guide plate 71R provided at the air-discharge opening Rb, rainwater or dust is prevented from entering the roof portion and is discharged from the rear end of the air-discharge opening Rb even in the circumstances in which they may enter from the air-discharge opening Rb.

[Cabin: Air-Conditioning System]

As shown in FIGS. 8 and 9, the air conditioner S is positioned to bulge rearward further from the rear pillars 43 at a rear end portion of the roof portion R. The air conditioner S is supported to a cross frame extending between the right and left rear pillars 43 at a lower level than the upper ends of the rear pillars 43. The air conditioner S includes an air-conditioning unit 75 having an evaporator (not shown) and an electric heater therein, and a blast fan 77 for directing air to the air-conditioning unit 75. In the interior of the cabin D, an air-intake 80 is formed under the bottom wall 61 (ceiling wall of the cabin), and a pair of right and left air-conditioning ducts 78 are provided at opposite lateral side of the bottom wall 61 for supplying air fed out from the air conditioner S to the interior of the cabin D.

The air conditioner S in this embodiment is configured to cool air by radiating heat from a coolant compressed by a driven compressor through a capacitor and then expanding the coolant at an expansion valve for supply to the evaporator. Instead, the air conditioner S may be a heat-pump type switchable between air cooling and heat cooling.

An inclined wall portion 61A is formed in the bottom wall 61 to bend obliquely downward at a front position of the air conditioner S, while an extending wall 79 is formed to extend rearward from an upper end side of the inclined wall portion 61A. The air conditioner is positioned and an air-intake space H for supplying air to the blast fan 77 is formed between a rear portion of the inclined wall portion 61A and the extending wall 79. A sirocco fan is used as the blast fan 77 for drawing air from an upper end thereof to direct air to the direction of the side air-conditioning unit 75.

A ventilation duct 81 directed vertically is connected to the ventilation space T to communicate with the air-intake space H, and a switching plate 82 is provided to open and close the ventilation duct 81. The ventilation duct 81 is positioned in the vicinity of the battery housing space 64A of the unit housing case 64, and formed as a square pipe with a portion adjacent to an outer wall of the battery housing space 64A being inclined as viewed from the top, as shown in FIG. 9.

The switching plate 82 is manually opened and closed. In a closed position shown in imaginary line in FIG. 8, ambient air is prevented from being introduced into the air-intake space H. When the switching plate is operated to an opened position shown in solid line in FIG. 8, ambient air is drawn from a ventilation opening 72 to the ventilation space T and is further supplied to the air-intake space H through the ventilation duct 81.

With the above arrangement, when the air conditioner S is activated with the switching plate 82 being in the closed position, the temperature is regulated by the air-conditioning unit 75 having drawn air from the air-intake inlet 80 in the cabin. Temperature-modulated air is fed to the interior of the cabin through the air-conditioning ducts, thereby to achieve air conditioning with a circulation mode for performing air conditioning by circulating air within the cabin.

On the other hand, when the air conditioner S is activated with the switching plate 82 being in the opened position, ambient air from the ventilation space T is drawn via the ventilation duct 81 with the air-intake inlet 80 being closed to shut off air from the cabin, thereby to achieve air conditioning with an ambient air mixing mode for performing air conditioning by feeding air that has been temperature-modulated by the air-conditioning unit 75 into the cabin through the air-conditioning ducts 78 to mix ambient air with air within the cabin. Since air is taken from the ventilation space T, there is no waste of energy when air is cooled by the air conditioner S compared with the construction for drawing air whose temperature is increased by heat from the power unit B, for example.

In particular, since the power unit B and the air conditioner S are provided in the roof portion R of the cabin D, there is no need to secure space for providing the power unit B in the propelling vehicle body A. Thus, it is not necessary to provide pipework in the cabin D for supplying and discharging the coolant fed from the capacitor, which simplifies the overall construction compared with the construction having the air conditioner S driven by the engine 4 in the propelling vehicle body A, for example. Further, since the power unit B and the air conditioner S are provided in the roof portion R of the cabin D, not only it is unnecessary to secure the space for providing the power unit B in the propelling vehicle body A, but also it is possible to provide them in a space-saving way because the roof portion R is relatively easily changeable in design.

[Power Control Unit]

Since the right-side first power control unit E1 and the left-side second power control unit E2 are different from each other only in where power is outputted and basically have a common construction, those are collectively described as the power control unit E. As shown in FIGS. 10 to 14, the power control unit E is provided above the rear wheel 2 under the rear fender 8. As described above, the power control unit E is formed as a VVVF type inverter for producing three-phase current that has predetermined frequency with predetermined voltage.

The power control unit E is positioned under the rear fender 8 to achieve satisfactory heat radiation. On the other hand, it is positioned above the rear wheel 2 and thus a regulating device is provided for preventing the power control unit from contacting mud or pebbles splashed or flipped by the rear wheel 2 in the operational mode. A casing portion 85 acting as the regulating device is provided to house the power control unit E, while a horizontal protection plate 86 acting as the regulating device is provided under the casing portion 85. The protection plate 86 is made of material having increased strength such as steel material, and is connected and fixed to a vertical wall 8A of the rear fender 8 with the casing portion 85 being supported to a top surface of the protection plate 86. A scraper 87 made of material having increased strength such as steel material is provided in a bottom surface of the protection plate 86 at a rear end side thereof to project downward, while a partition wall 88 is provided forming a vertical wall in the top surface of the protection plate 86 at the rear end side thereof. While the casing portion 85 is connected to the top surface of the protection plate 86 in the drawings, a gap may be defined between the casing portion 85 and the top surface of the protection plate 86. The scraper 87 may be provided at a front side position of the protection plate 86. Instead, two scrapers 87 may be provided both in the rear side position and the front side position, or three or more scrapers 87 may be provided.

The casing portion 85 has opened front end and rear end. A feeding duct 89 is formed at the front end for introducing air in the cabin into the power control unit E as cooling air, and a cooling fan 90 is provided in an intermediate portion between the feeding duct 89 and the casing portion 85. An air-intake opening 89A is provided in the vertical wall 8A of the rear fender 8 to which the feeding duct 89 is connected. An open space 88S is defined between an end portion of the partition wall 88 adjacent to the center of the vehicle body and the vertical wall 8A of the rear fender 8 to feed out air having passed within the casing portion 85.

Further, an output cable 91 for supplying power from the first power control unit E1 to the generator motor M, a supply cable 92 (an example of a power cable) for supplying DC power from the power unit B to the first power control unit E1, and a control cable 93 extend through a side wall of the first power control unit E1 at an inner side of the vehicle body to the interior of the cabin adjacent to the center of the vehicle body A. Similarly, an output cable 91 for supplying power from the second power control unit E2 to the first pump motor P1$m$ and the second pump motor P2$m$, a supply cable 92 (an example of a power cable) for supplying DC power from the power unit B to the second power control unit E2, and a control cable 93 extend through a side wall of the second power control unit E2 at an inner side of the vehicle body and the vertical wall 8A of the rear fender 8 to the interior of the cabin adjacent to the center of the vehicle body A.

The above arrangement achieves satisfactory heat radiation by effectively using the space between the rear fender 8 and rear wheel 2 while providing the power control unit E in the space opened downward. In particular, providing the regulating device including the casing portion 85 and the protection plate 86 prevents mud or pebbles splashed or flipped by the rear wheel 2 from being attached to the power control unit E to avoid damage of the power control unit E. Even in the circumstances in which a clod of soil or straw is attached to the rear wheel 2, the scraper 87 comes into contact with the clod or straw to scrape it off the rear wheel 2, which would not ruin the cooling effect.

In addition, clean air within the cabin is drawn through the air-intake opening 89A to be supplied to the power control unit E by the cooling fan 90, thereby to radiate heat. In this way, air having cooled the power control unit E is fed out from the rear end of the casing portion 85 and discharged rearward from the open space 88S. Such an arrangement achieves cooling of the unit for bringing air from the outside of the vehicle body into direct contact with the power control unit, and cooling of the unit by supplying air from the interior of the cabin D satisfactorily.

The power control unit E may not necessarily be provided under the rear fender 8. Instead, part of the power control unit E may be projected upward from the top surface of the rear fender 8 or projected into the cabin (inner side of the vehicle body). Even such an arrangement would not mar the advantageous aspect of providing the power control unit E in the portion around the rear fender 8.

[Power Control System]

FIG. 15 is an outline of a power control system, which includes a power supply system having the supply cable 92 for supplying DC power from the secondary battery 59 of the power unit B to the first and second power control units E1 and E2 through the relay box G The first power control unit E1 is configured to convert supplied DC power to three-phase AC power for supply to the generator motor M through the output cable 91, while the second power control unit E2 is configured to convert supplied DC power to three-phase AC power for supply to the first pump motor P1$m$ and the second pump motor P2$m$ through the output cable 91. The second power control unit E2 also supplies power to the capacitor of the air conditioner 5, though not shown in the drawings.

As noted above, the main control system includes the main control unit 101, the engine control unit 102, the hybrid control unit 103, the motor control unit 104, and the rectifier pressure-rising unit 105.

The engine 4 has a common-rail fuel injection system. In order to control this fuel injection system, the engine control unit 102 obtains a signal from an acceleration pedal sensor 54S, a signal from a rotational speed sensor 99 (see FIG. 2) for detecting rotational speed of the engine 4, a signal from a fuel pressure sensor (not shown) for detecting pressure of fuel in a common rail, and a signal from an air-intake pressure sensor (not shown) of an air-intake portion to determine the time for operation of an injector (not shown). Such an arrangement allows the engine control unit 102 to recognize a load applied to the engine 4 and output information that is required in activating the generator motor M including the load applied to the engine 4, the rotational speed of the engine 4, the amount of depression of the acceleration pedal 54, etc. The rotational speed sensor 99 is formed as a pick-up type and provided vertically to extend through an opening formed in the front housing 5A of the transmission housing 5 with a sensing portion provided at a lower end of the sensor being positioned in the proximity to the outer periphery of the flywheel 15, thereby to count the number of rotation of the flywheel 15 based on variations in density of magnetic flux. It should be noted that the rotational speed sensor 99 may optically count the number of rotation of the output shaft 4A or the flywheel 15, for example.

In this tractor, a load sensor for detecting a load applied to the engine 4 may be provided in the engine 4 or the propelling drive system to allow the main control unit 101 to obtain information detected by the load sensor. The engine 4 is not limited to a diesel type, but may be a gasoline type.

The hybrid control unit 103 outputs a control signal to the power unit B and the relay box G through a battery control cable 98 based on the information from the main control unit 101. The motor control unit 104 outputs a control signal to the first and second power control units E1 and E2 through a control cable 93 based on the information from the main control unit 101.

The rectifier pressure-rising unit 105 has a function of a rectifier circuit for converting three-phase alternating current generated at the generator motor M to direct current, and a function of a DC-DC converter for converting the converted direct current to a high-voltage current. The DC power is transmitted through a power transmission cable 94.

As described above, the main control system is provided under the driver's seat 9, the power unit B and the relay box G are provided in the roof portion R of the cabin D, the first power control unit E1 is provided under the right rear fender 8, and the second power control unit E2 is provided under the left rear fender 8. Due to such a positional relationship, the supply cable 92 for supplying DC power from the power unit B to the first and second power control units E1 and E2 extends through the interior of the right intermediate pillar 42. Further, the battery control cable 98 for outputting a control signal from the hybrid control unit 103 of the main control system to the power unit B extends through the interior of the right rear pillar 43.

The above-noted power control system allows the engine control unit 4 to activate the engine 4 in an energy-efficient low-speed region based on the signal from the main control unit 101. When the main control unit 101 determines that the load applied to the engine 4 is below a threshold value based on the information obtained by the engine control unit 102, generated power from the generator motor M is increased in pressure by the rectifier pressure-rising unit 105. The pressure-risen DC power is transmitted from the power transmission cable 94 to the supply cable 92, and is supplied to the power unit B for power charge. In charging power, the battery management system 60 manages the charge to the secondary battery 59. In particular, owing to the arrangement in which the supply cable 92 is arranged in the interior of the intermediate pillar 42 while the battery control cable 98 is arranged in the interior of the rear pillar 43, even when noise is present in the supply cable 92, for example, such noise would not adversely effect the control signal transmitted to the battery control cable 98.

Reversely, when the main control unit 101 determines that the load applied to the engine 4 exceeds the threshold value, power from the power unit B is supplied from the relay box G to the first power control unit E1 while the motor control unit 104 outputs a control signal to the first power control unit E1, thereby to supply three-phase AC power from the first power control unit E1 to the generator motor M to assist the engine rotation by driving power of the generator motor M, which achieves a traveling condition free from power shortage or engine stop. Thus, in supplying power to the generator motor M, output voltage and output frequency of three-phase AC power are determined based on the control information including the rotational speed of the engine 4, the load value, the amount of depression of the acceleration pedal 54, etc. In starting power supply from the secondary battery 59 to the first power control unit E1, a proper one of the plurality of resistors is selected in the relay box G to eliminate a disadvantage that great power current is drastically supplied. In power supply as well, a proper resistor is selected to eliminate a disadvantage that great power current supplied from the secondary battery 59 is dropped sharp.

The second power control unit E2 is configured to convert DC power to three-phase AC power in required timing based on a signal from the motor control unit 104 for supply to the first pump motor P1*m* and the second pump motor P2*m*. The main control unit 101 detects an operation of levers or switches and activates the first pump motor P1*m* and the second pump motor P2*m* when power supply is required, as a result of which wasteful consumption of electric power can be suppressed.

The present invention is applicable not only to a work vehicle to be propelled by driver power only from an electric motor but also to a hybrid-type work vehicle to be propelled by drive power from the electric motor and an engine as well as other work vehicles including a ride-on rice planter, a lawn mower, a combine harvester or the like.

What is claimed is:

1. A work vehicle comprising:
   a power unit;
   an electric motor activated by electric power from the power unit;
   a power control unit for controlling electric power supplied from the power unit to the electric motor; and
   a propelling transmission system for receiving drive power from the electric motor,
   wherein the power control unit is arranged in a portion of a rear fender projecting outwardly from a propelling vehicle body to cover above a rear wheel.

2. The work vehicle as claimed in claim 1, wherein the power control unit is arranged in a position of the rear fender opposing to the rear wheel, and
   wherein a limiting device is provided for preventing mud from entering the power control unit.

3. The work vehicle as claimed in claim 2, wherein the limiting device includes a case portion for housing the power control unit, a protection plate provided under the case portion and above the rear wheel, and a scraper projecting downward from the bottom surface of the protection plate.

4. The work vehicle as claimed in claim 1 further comprising a duct for directing air in a space adjacent to the center of the propelling vehicle body relative to the rear fender to the power control unit as cooling air, and a cooling fan for drawing air from the duct for supply to the power control unit.

5. The work vehicle as claimed in claim 1 further comprising a supply cable for supplying electric power from the power unit to the power control unit, and an output cable for outputting electric power from the power control unit to the electric motor, the supply cable and the output cable extending from a side wall of the power control unit adjacent to the inner side of the propelling vehicle body.

* * * * *